United States Patent
Vinson et al.

(10) Patent No.: US 8,509,230 B2
(45) Date of Patent: *Aug. 13, 2013

(54) SOFTWARE STREAMING SYSTEM AND METHOD

(75) Inventors: Jeffrey Vinson, San Jose, CA (US); Steig G. Westerberg, San Jose, CA (US); Jeffrey De Vries, Sunnyvale, CA (US)

(73) Assignee: Numecent Holdings, Inc., Irvine, CA (US)

( * ) Notice: Subject to any disclaimer, the term of this patent is extended or adjusted under 35 U.S.C. 154(b) by 492 days.

This patent is subject to a terminal disclaimer.

(21) Appl. No.: 12/509,210

(22) Filed: Jul. 24, 2009

(65) Prior Publication Data

US 2010/0023640 A1 Jan. 28, 2010

Related U.S. Application Data

(63) Continuation of application No. 11/100,956, filed on Apr. 6, 2005, now Pat. No. 7,577,751, which is a continuation of application No. 10/228,680, filed on Aug. 26, 2002, now Pat. No. 7,096,253, which is a continuation of application No. 09/098,075, filed on Jun. 16, 1998, now Pat. No. 6,453,334.

(60) Provisional application No. 60/049,759, filed on Jun. 16, 1997.

(51) Int. Cl.
*H04L 12/28* (2006.01)

(52) U.S. Cl.
USPC ............ 370/389; 709/203; 709/231; 709/249

(58) Field of Classification Search
None
See application file for complete search history.

(56) References Cited

U.S. PATENT DOCUMENTS

| 4,562,306 A | 12/1985 | Chou et al. |
| 4,796,220 A | 1/1989 | Wolfe |

(Continued)

FOREIGN PATENT DOCUMENTS

| EP | 0658837 | 6/1995 |
| EP | 0813325 | 12/1997 |

(Continued)

OTHER PUBLICATIONS

Bailey et al., "Chart of Darkness: Mapping a Large Intranet", Dept of Computer Science, FEIT, The Australian National University, Canberra ACT 0200, Australia, pp. 1-23, http://pastime.anu.edu.au/nick/pubs/www9/cod.html, Feb. 21, 2001.

(Continued)

*Primary Examiner* — Robert Wilson
(74) *Attorney, Agent, or Firm* — Sheppard, Mullin, Richter & Hampton LLP

(57) ABSTRACT

A method for streaming software may include downloading blocks associated with a software title until an executable threshold is reached, initiating execution of the software title, and continuing to download blocks of the software title while the software title is executed. Another method for streaming software may include sending to a client data sufficient for the client to build a virtual directory structure for use in executing a software title, streaming a subset of blocks associated with the software title to the client, and streaming additional blocks associated with the software title to the client on demand. A system for streaming software may include a server computer and a client computer. The server computer may include a program database and a streaming engine. In operation the streaming engine may stream an executable streaming application from the program database to the client.

17 Claims, 7 Drawing Sheets

(56) References Cited

U.S. PATENT DOCUMENTS

| | | |
|---|---|---|
| 4,949,257 A | 8/1990 | Orbach |
| 4,970,504 A | 11/1990 | Chen |
| 4,999,806 A | 3/1991 | Chernow et al. |
| 5,012,512 A | 4/1991 | Basso et al. |
| 5,032,979 A | 7/1991 | Hecht et al. |
| 5,047,928 A | 9/1991 | Wiedemer |
| 5,063,500 A | 11/1991 | Shorter |
| 5,109,413 A | 4/1992 | Comerford et al. |
| 5,166,886 A | 11/1992 | Molnar et al. |
| 5,210,850 A | 5/1993 | Kelly et al. |
| 5,293,556 A | 3/1994 | Hill et al. |
| 5,311,596 A | 5/1994 | Scott et al. |
| 5,325,489 A | 6/1994 | Mitsuhira et al. |
| 5,442,791 A | 8/1995 | Wrabetz et al. |
| 5,481,611 A | 1/1996 | Owens et al. |
| 5,495,411 A | 2/1996 | Ananda |
| 5,513,305 A * | 4/1996 | Maghbouleh ............... 715/234 |
| 5,533,123 A | 7/1996 | Force et al. |
| 5,537,566 A | 7/1996 | Konno et al. |
| 5,544,321 A | 8/1996 | Theimer et al. |
| 5,546,526 A | 8/1996 | Li et al. |
| 5,547,202 A | 8/1996 | Tsumura |
| 5,548,645 A | 8/1996 | Ananda |
| 5,553,139 A | 9/1996 | Ross et al. |
| 5,553,143 A | 9/1996 | Ross et al. |
| 5,555,376 A | 9/1996 | Theimer et al. |
| 5,611,050 A | 3/1997 | Theimer et al. |
| 5,629,980 A | 5/1997 | Stefik et al. |
| 5,630,049 A | 5/1997 | Cardoza et al. |
| 5,635,906 A | 6/1997 | Joseph |
| 5,638,513 A | 6/1997 | Ananda |
| 5,652,887 A | 7/1997 | Dewey et al. |
| 5,666,293 A | 9/1997 | Metz et al. |
| 5,696,965 A | 12/1997 | Dedrick |
| 5,701,427 A | 12/1997 | Lathrop |
| 5,706,440 A | 1/1998 | Compliment et al. |
| 5,715,403 A | 2/1998 | Stefik |
| 5,758,150 A | 5/1998 | Bell et al. |
| 5,761,445 A | 6/1998 | Nguyen |
| 5,764,906 A | 6/1998 | Edelstein et al. |
| 5,764,918 A | 6/1998 | Poulter |
| 5,765,152 A | 6/1998 | Erickson |
| 5,765,153 A | 6/1998 | Benantar et al. |
| 5,768,528 A | 6/1998 | Stumm |
| 5,768,539 A | 6/1998 | Metz et al. |
| 5,771,354 A | 6/1998 | Crawford |
| 5,778,395 A | 7/1998 | Whiting et al. |
| 5,790,753 A | 8/1998 | Krishnamoorthy et al. |
| 5,805,809 A | 9/1998 | Singh et al. |
| 5,809,144 A | 9/1998 | Sirbu et al. |
| 5,812,865 A | 9/1998 | Theimer et al. |
| 5,812,881 A | 9/1998 | Ku et al. |
| 5,818,711 A | 10/1998 | Schwabe et al. |
| 5,822,537 A | 10/1998 | Katseff et al. |
| 5,832,289 A | 11/1998 | Shaw et al. |
| 5,835,722 A | 11/1998 | Bradshaw et al. |
| 5,838,910 A | 11/1998 | Domenikos et al. |
| 5,839,910 A | 11/1998 | Meller et al. |
| 5,855,020 A | 12/1998 | Kirsch |
| 5,874,986 A | 2/1999 | Gibbon et al. |
| 5,878,425 A | 3/1999 | Redpath |
| 5,881,229 A | 3/1999 | Singh et al. |
| 5,881,232 A | 3/1999 | Cheng et al. |
| 5,892,915 A | 4/1999 | Duso et al. |
| 5,892,953 A | 4/1999 | Bhagria et al. |
| 5,895,454 A | 4/1999 | Harrington |
| 5,895,471 A | 4/1999 | King et al. |
| 5,901,315 A | 5/1999 | Edwards et al. |
| 5,903,721 A | 5/1999 | Sixtus |
| 5,903,732 A | 5/1999 | Reed et al. |
| 5,903,892 A | 5/1999 | Hoffert et al. |
| 5,905,868 A | 5/1999 | Baghai et al. |
| 5,905,990 A | 5/1999 | Inglett |
| 5,909,545 A | 6/1999 | Frese, II et al. |
| 5,911,043 A | 6/1999 | Duffy et al. |
| 5,918,015 A | 6/1999 | Suzuki et al. |
| 5,923,885 A | 7/1999 | Johnson et al. |
| 5,925,126 A | 7/1999 | Hsieh |
| 5,926,552 A | 7/1999 | McKeon |
| 5,929,849 A | 7/1999 | Kikinis |
| 5,931,907 A | 8/1999 | Davies et al. |
| 5,933,603 A | 8/1999 | Vahalia et al. |
| 5,933,822 A | 8/1999 | Braden-Harder et al. |
| 5,940,591 A | 8/1999 | Boyle et al. |
| 5,943,424 A | 8/1999 | Berger et al. |
| 5,948,062 A | 9/1999 | Tzelnic et al. |
| 5,948,065 A | 9/1999 | Eilert et al. |
| 5,949,877 A | 9/1999 | Traw et al. |
| 5,950,195 A | 9/1999 | Stockwell et al. |
| 5,953,506 A | 9/1999 | Kalra et al. |
| 5,956,717 A | 9/1999 | Kraay et al. |
| 5,960,411 A | 9/1999 | Hartman et al. |
| 5,960,439 A | 9/1999 | Hamner et al. |
| 5,961,586 A | 10/1999 | Pedersen |
| 5,961,591 A | 10/1999 | Jones et al. |
| 5,963,444 A | 10/1999 | Shidara et al. |
| 5,963,944 A | 10/1999 | Adams |
| 5,968,176 A | 10/1999 | Nessett et al. |
| 5,973,696 A | 10/1999 | Agranat et al. |
| 5,987,454 A | 11/1999 | Hobbs |
| 5,987,608 A | 11/1999 | Roskind |
| 6,003,065 A | 12/1999 | Yan et al. |
| 6,003,095 A | 12/1999 | Pekowski et al. |
| 6,014,686 A | 1/2000 | Elnozahy et al. |
| 6,018,619 A | 1/2000 | Allard et al. |
| 6,026,166 A | 2/2000 | LeBourgeois |
| 6,028,925 A | 2/2000 | Van Berkum et al. |
| 6,038,379 A | 3/2000 | Fletcher et al. |
| 6,038,610 A | 3/2000 | Belfiore et al. |
| 6,047,323 A | 4/2000 | Krause |
| 6,049,792 A | 4/2000 | Hart et al. |
| 6,049,835 A | 4/2000 | Gagnon |
| 6,061,738 A | 5/2000 | Osaku et al. |
| 6,065,043 A | 5/2000 | Domenikos et al. |
| 6,076,104 A | 6/2000 | McCue |
| 6,081,842 A | 6/2000 | Shachar |
| 6,085,186 A | 7/2000 | Christianson et al. |
| 6,085,193 A | 7/2000 | Malkin et al. |
| 6,088,705 A | 7/2000 | Lightstone et al. |
| 6,092,194 A | 7/2000 | Touboul |
| 6,094,649 A | 7/2000 | Bowen et al. |
| 6,098,072 A | 8/2000 | Sluiman et al. |
| 6,099,408 A | 8/2000 | Schneier et al. |
| 6,101,482 A | 8/2000 | DiAngelo et al. |
| 6,101,491 A | 8/2000 | Woods |
| 6,101,537 A | 8/2000 | Edelstein et al. |
| 6,108,420 A | 8/2000 | Larose et al. |
| 6,115,741 A | 9/2000 | Domenikos et al. |
| 6,138,271 A | 10/2000 | Keeley |
| 6,154,878 A | 11/2000 | Saboff |
| 6,157,948 A | 12/2000 | Inoue et al. |
| 6,167,510 A | 12/2000 | Tran |
| 6,167,522 A | 12/2000 | Lee et al. |
| 6,173,311 B1 | 1/2001 | Hassett et al. |
| 6,173,330 B1 | 1/2001 | Guo et al. |
| 6,185,608 B1 | 2/2001 | Hon et al. |
| 6,192,398 B1 | 2/2001 | Hunt |
| 6,192,408 B1 | 2/2001 | Vahalia et al. |
| 6,195,694 B1 | 2/2001 | Chen et al. |
| 6,212,640 B1 | 4/2001 | Abdelnur et al. |
| 6,219,693 B1 | 4/2001 | Napolitano et al. |
| 6,226,412 B1 | 5/2001 | Schwab |
| 6,226,665 B1 | 5/2001 | Deo et al. |
| 6,253,234 B1 | 6/2001 | Hunt et al. |
| 6,275,470 B1 | 8/2001 | Ricciulli |
| 6,275,496 B1 | 8/2001 | Burns et al. |
| 6,278,992 B1 | 8/2001 | Curtis et al. |
| 6,281,898 B1 | 8/2001 | Nikolovska et al. |
| 6,282,712 B1 | 8/2001 | Davis et al. |
| 6,298,356 B1 | 10/2001 | Jawahar et al. |
| 6,301,584 B1 | 10/2001 | Ranger |
| 6,301,605 B1 | 10/2001 | Napolitano et al. |
| 6,301,629 B1 | 10/2001 | Sastri et al. |
| 6,301,685 B1 | 10/2001 | Shigeta |

| | | | | | | |
|---|---|---|---|---|---|---|
| 6,311,221 | B1 | 10/2001 | Raz et al. | 7,192,352 B2 | 3/2007 | Walker et al. |
| 6,314,425 | B1 | 11/2001 | Serbinis et al. | 7,197,516 B1 | 3/2007 | Hipp et al. |
| 6,321,260 | B1 | 11/2001 | Takeuchi et al. | 7,246,119 B2 | 7/2007 | Kuwata et al. |
| 6,330,561 | B1 | 12/2001 | Cohen et al. | 7,577,751 B2 * | 8/2009 | Vinson et al. ............... 709/231 |
| 6,343,287 | B1 | 1/2002 | Kumar et al. | 2001/0003828 A1 | 6/2001 | Peterson et al. |
| 6,347,398 | B1 | 2/2002 | Parthasarathy et al. | 2001/0014878 A1 | 8/2001 | Mitra et al. |
| 6,356,946 | B1 | 3/2002 | Clegg et al. | 2001/0027493 A1 | 10/2001 | Wallace |
| 6,369,467 | B1 | 4/2002 | Noro | 2001/0034736 A1 | 10/2001 | Eylon et al. |
| 6,370,686 | B1 | 4/2002 | Delo et al. | 2001/0037399 A1 | 11/2001 | Eylon et al. |
| 6,374,402 | B1 | 4/2002 | Schmeidler et al. | 2001/0037400 A1 | 11/2001 | Raz et al. |
| 6,385,696 | B1 | 5/2002 | Doweck | 2001/0042833 A1 | 11/2001 | Kenway |
| 6,389,467 | B1 | 5/2002 | Eyal | 2001/0044850 A1 | 11/2001 | Raz et al. |
| 6,418,554 | B1 | 7/2002 | Delo et al. | 2001/0044851 A1 | 11/2001 | Rothman et al. |
| 6,418,555 | B2 | 7/2002 | Mohammed | 2002/0015106 A1 | 2/2002 | Taylor |
| 6,418,556 | B1 | 7/2002 | Bennington et al. | 2002/0019864 A1 | 2/2002 | Mayer |
| 6,424,991 | B1 | 7/2002 | Gish | 2002/0035674 A1 | 3/2002 | Vetrivelkumaran et al. |
| 6,425,017 | B1 | 7/2002 | Dievendorff et al. | 2002/0038374 A1 | 3/2002 | Gupta et al. |
| 6,449,688 | B1 | 9/2002 | Peters et al. | 2002/0042833 A1 | 4/2002 | Hendler et al. |
| 6,453,334 | B1 * | 9/2002 | Vinson et al. ............... 709/203 | 2002/0057893 A1 | 5/2002 | Wood et al. |
| 6,457,076 | B1 | 9/2002 | Cheng et al. | 2002/0059402 A1 | 5/2002 | Belanger |
| 6,508,709 | B1 | 1/2003 | Karmarkar | 2002/0065848 A1 | 5/2002 | Walker et al. |
| 6,510,458 | B1 | 1/2003 | Berstis et al. | 2002/0078170 A1 | 6/2002 | Brewer et al. |
| 6,510,462 | B2 | 1/2003 | Blumenau | 2002/0078203 A1 | 6/2002 | Greschler et al. |
| 6,510,466 | B1 | 1/2003 | Cox et al. | 2002/0083183 A1 | 6/2002 | Pujare et al. |
| 6,524,017 | B2 | 2/2003 | Lecocq et al. | 2002/0083187 A1 | 6/2002 | Sim et al. |
| 6,574,618 | B2 | 6/2003 | Eylon et al. | 2002/0087717 A1 | 7/2002 | Artzi et al. |
| 6,584,507 | B1 | 6/2003 | Bradley et al. | 2002/0087883 A1 | 7/2002 | Wohlgemuth et al. |
| 6,587,857 | B1 | 7/2003 | Carothers et al. | 2002/0087963 A1 | 7/2002 | Eylon et al. |
| 6,594,682 | B2 | 7/2003 | Peterson et al. | 2002/0091763 A1 | 7/2002 | Shah et al. |
| 6,598,125 | B2 | 7/2003 | Romm | 2002/0091901 A1 | 7/2002 | Romm |
| 6,601,103 | B1 | 7/2003 | Goldschmidt Iki et al. | 2002/0116476 A1 | 8/2002 | Eyal et al. |
| 6,601,110 | B2 | 7/2003 | Marsland | 2002/0133491 A1 | 9/2002 | Sim et al. |
| 6,605,956 | B2 | 8/2003 | Farnworth et al. | 2002/0138640 A1 | 9/2002 | Raz et al. |
| 6,609,114 | B1 | 8/2003 | Gressel et al. | 2002/0147849 A1 | 10/2002 | Wong et al. |
| 6,611,812 | B2 | 8/2003 | Hurtado et al. | 2002/0156911 A1 | 10/2002 | Croman et al. |
| 6,622,137 | B1 | 9/2003 | Ravid et al. | 2002/0157089 A1 | 10/2002 | Patel et al. |
| 6,622,171 | B2 | 9/2003 | Gupta et al. | 2002/0161908 A1 | 10/2002 | Benitez et al. |
| 6,636,961 | B1 | 10/2003 | Braun et al. | 2002/0174215 A1 | 11/2002 | Schaefer |
| 6,651,251 | B1 | 11/2003 | Shoff et al. | 2003/0004882 A1 | 1/2003 | Holler et al. |
| 6,687,745 | B1 | 2/2004 | Franco et al. | 2003/0009538 A1 | 1/2003 | Shah et al. |
| 6,694,510 | B1 | 2/2004 | Willems | 2003/0056112 A1 | 3/2003 | Vinson et al. |
| 6,697,869 | B1 | 2/2004 | Mallart et al. | 2003/0105816 A1 | 6/2003 | Goswami |
| 6,711,619 | B1 | 3/2004 | Chandramohan et al. | 2003/0138024 A1 | 7/2003 | Williamson et al. |
| 6,732,179 | B1 | 5/2004 | Brown et al. | 2003/0140160 A1 | 7/2003 | Raz et al. |
| 6,735,631 | B1 | 5/2004 | Oehrke et al. | 2004/0036722 A1 | 2/2004 | Warren |
| 6,757,708 | B1 | 6/2004 | Craig et al. | 2004/0128342 A1 | 7/2004 | Maes et al. |
| 6,757,894 | B2 | 6/2004 | Eylon et al. | 2004/0133657 A1 | 7/2004 | Smith et al. |
| 6,763,370 | B1 | 7/2004 | Schmeidler et al. | 2004/0199566 A1 | 10/2004 | Carlson et al. |
| 6,772,209 | B1 | 8/2004 | Chernock et al. | 2004/0230784 A1 | 11/2004 | Cohen |
| 6,775,779 | B1 | 8/2004 | England et al. | 2004/0230971 A1 | 11/2004 | Rachman et al. |
| 6,779,179 | B1 | 8/2004 | Romm et al. | 2004/0267813 A1 | 12/2004 | Rivers-Moore et al. |
| 6,785,768 | B2 | 8/2004 | Peters et al. | 2004/0268361 A1 | 12/2004 | Schaefer |
| 6,785,865 | B1 | 8/2004 | Cote et al. | 2005/0010607 A1 | 1/2005 | Parker et al. |
| 6,801,507 | B1 | 10/2004 | Humpleman et al. | 2005/0010670 A1 | 1/2005 | Greschler et al. |
| 6,810,525 | B1 | 10/2004 | Safadi et al. | 2005/0091534 A1 | 4/2005 | Nave et al. |
| 6,816,909 | B1 | 11/2004 | Chang et al. | 2005/0114472 A1 | 5/2005 | Tan |
| 6,816,950 | B2 | 11/2004 | Nichols | 2005/0193139 A1 | 9/2005 | Vinson et al. |
| 6,832,222 | B1 | 12/2004 | Zimowski | 2005/0289617 A1 | 12/2005 | Safadi et al. |
| 6,836,794 | B1 | 12/2004 | Lucovsky et al. | 2006/0010074 A1 | 1/2006 | Zeitsiff et al. |
| 6,854,009 | B1 | 2/2005 | Hughes | 2006/0031165 A1 | 2/2006 | Nave et al. |
| 6,891,740 | B2 | 5/2005 | Williams | 2006/0047716 A1 | 3/2006 | Keith |
| 6,918,113 | B2 | 7/2005 | Patel et al. | 2006/0048136 A1 | 3/2006 | de Vries et al. |
| 6,925,495 | B2 | 8/2005 | Hegde et al. | 2006/0106770 A1 | 5/2006 | de Vries |
| 6,938,096 | B1 | 8/2005 | Greschler et al. | 2006/0123185 A1 | 6/2006 | de Vries et al. |
| 6,959,320 | B2 | 10/2005 | Shah et al. | 2006/0136389 A1 | 6/2006 | Cover et al. |
| 6,970,866 | B1 | 11/2005 | Pravetz et al. | 2007/0038642 A1 | 2/2007 | Durgin et al. |
| 6,985,915 | B2 | 1/2006 | Somalwar et al. | 2007/0043550 A1 | 2/2007 | Tzruya |
| 7,024,677 | B1 | 4/2006 | Snyder et al. | 2007/0067435 A1 | 3/2007 | Landis et al. |
| 7,028,305 | B2 | 4/2006 | Schaefer | 2007/0074223 A1 | 3/2007 | Lescouet et al. |
| 7,043,524 | B2 | 5/2006 | Shah et al. | 2007/0126749 A1 | 6/2007 | Tzruya et al. |
| 7,051,315 | B2 | 5/2006 | Artzi et al. | 2007/0129146 A1 | 6/2007 | Tzruya et al. |
| 7,062,567 | B2 | 6/2006 | Benitez et al. | 2007/0129990 A1 | 6/2007 | Tzruya et al. |
| 7,093,077 | B2 | 8/2006 | Cooksey et al. | 2007/0130075 A1 | 6/2007 | Song et al. |
| 7,096,253 | B2 * | 8/2006 | Vinson et al. ............... 709/203 | 2007/0130292 A1 | 6/2007 | Tzruya et al. |
| 7,112,138 | B2 | 9/2006 | Hedrick et al. | 2007/0168309 A1 | 7/2007 | Tzruya et al. |
| 7,130,616 | B2 | 10/2006 | Janik | 2007/0196074 A1 | 8/2007 | Jennings et al. |
| 7,137,072 | B2 | 11/2006 | Bauer et al. | | | |
| 7,171,390 | B1 | 1/2007 | Song et al. | | | |
| 7,191,441 | B2 | 3/2007 | Abbott et al. | | | |

FOREIGN PATENT DOCUMENTS

| | | |
|---|---|---|
| EP | 1020824 | 7/2000 |
| EP | 1143349 | 10/2001 |
| TW | 200644550 | 12/2006 |
| WO | WO-98/40993 | 9/1998 |
| WO | WO-98/50853 | 11/1998 |
| WO | WO-99/57863 | 11/1999 |
| WO | WO-99/60458 | 11/1999 |
| WO | WO-00/04681 | 1/2000 |
| WO | WO-00/31657 | 6/2000 |
| WO | WO-00/31672 | 6/2000 |
| WO | WO-00/56028 | 9/2000 |
| WO | WO-01/27805 | 4/2001 |
| WO | WO-01/46856 | 6/2001 |
| WO | WO-02/44840 | 6/2002 |
| WO | WO-2006/022745 | 3/2006 |
| WO | WO-2006/047133 | 5/2006 |
| WO | WO-2006/055445 | 5/2006 |
| WO | WO-2006/102532 | 9/2006 |
| WO | WO-2006/102621 | 9/2006 |

OTHER PUBLICATIONS

Boneh et al, "An Attack on RSA Given a Small Fraction of the Private Key Bits", Advances in Cryptology—ASIACRYPT '98, Lecture Notes in Computer Science, 25-34, V.1514, Springer-Verlag Berlin Heidelberg, retrieved online on Jun. 15, 2006 at http://crypto.stanford.edu/.about.dabo/abstracts/bits.sub.--of.sub.--d.ht- ml (1998).

Brin et al., "The Anatomy of a Large-Scale Hypertextual Web Search Engine", Computer Science Department, Stanford University, Stanford, CA 94305, pp. 1-20.

Chu et al, "REFEREE: Trust Management for Web Applications", Proceedings of the Sixth International World Wide Web Conference, 1997, retrieved online on Jun. 15, 2006 at http://www.si.umich.edu/~presnick/papers/Referee/www6-referee.html.

Faupel, Status of Industry Work in Signed Mobile Code, Joint European Networking Conference (JENC), May 1997, pp. 313-1-313-8.

Fiedler et al, "UNIX System V, Release 4 Administration", Second Edition, 1991, 1-13, 37-116, 152-153, 175-200, 291-312, Hayden Books, Carmel, Indiana, USA.

George et al, "Secure Transaction Processing in Firm Real-Time Database Systems", SIGMOD International Conference on Management of Data 1997, 462-473, V26, Issue 2, Association for Computing Machinery (ACM) Press, Tucson, Arizona, United States.

Gralla, Chapter 44, "Shopping on the Internet" How the Internet Works, IEEE Personal Communications, Aug. 1999, 260-67, QUE-A divison of Macmillon Computer Publishing, Millenium Edition.

Microsoft Corp., Computer Dictionary, 3rd edition, 1997, 119 & 305, Microsoft Press.

Microsoft, "Understanding Universal Plug and Play", pp. 1-39, Feb.-Jun. 2000.

Morrow et al., "Indexing Within-The Lost Gold Within the Enetrprise", Endeavors Technology, Aug. 22, 2000, pp. 1-6.

Mullender et al, "Amoeba: A Distributed Operating System for the 1990s", Computer Magazine, May 1990, 44-53, 23(5).

Nakayoshi et al, "A Secure Private File System with Minimal System Administration", Communications, Computers and Signal Processing, 1997 IEEE Pacific Rim Conference, 251-255, vol. 1.

O'Mahony, "Security Considerations in a Network Management Environment", 1994, 12-17, vol. 8, IEEE, USA.

Pyarali et al, "Design and Performance of an Object-Oriented Framework for High-Speed Electronic Medical Imaging, Fall 1996", Computing Systems Journal, 331-375, vol. 9 No. 4, USENIX, retrieved online on Jun. 15, 2006 at http://www.cs.wustl.edu/.about.schmidt/PDF/COOTS-96.pdf.

Rappaport, "Robots & Spiders & Crawlers: How Web and Intranet Search Engines Follow Links to Build Indexes", Infoseek Software, pp. 1-38 (Oct. 1999).

Reinhardt, "An Architectural Overview of UNIX Network Security", ARINC Research Corporation, Sep. 19, 1992, retrieved online on Jun. 15, 2006 at http://www.clusit.it/whitepapers/unixnet.pdf.

Sirbu et al., "Netbill: An Internet Commerce System Optimized for Network-Delivered Services", IEEE Personal Communications, 2(4):34-39 (Aug. 1995).

Tardo et al., "Mobile Agent Security and Telescript", 4.sup.th International Conference of the IEEE Computer Society (IEEE CompCon1996), Feb. 1996.

International Search Report of PCT Application No. PCT/US2004/28195, May 2, 2006, 3 Pages.

Written Opinion of PCT Application No. PCT/US2004/28195, May 2, 2006, 4 Pages.

International Search Report of PCT Application No. PCT/US2005/41024, Feb. 27, 2007, 1 Page.

Written Opinion of PCT Application No. PCT/US2005/41024, Feb. 27, 2007, 3 Pages.

International Search Report of PCT Application No. PCT/US2006/10637, Sep. 25, 2007, 1 Page.

Written Opinion of PCT Application No. PCT/US2006/10637, Sep. 25, 2007, 4 Pages.

International Search Report of PCT Application No. PCT/US2006/10904, Dec. 26, 2007, 1 Page.

Co-pending U.S. Appl. No. 09/098,075, filed Jun. 16, 1998.

Notice of Allowance Mailed Feb. 19, 2002 in Co-pending U.S. Appl. No. 09/098,075, filed Jun. 16, 1998.

Non-Final Office Action Mailed May 22, 2001 in Co-pending U.S. Appl. No. 09/098,075, filed Jun. 16, 1998.

Non-Final Office Action Mailed Nov. 14, 2000 in Co-pending U.S. Appl. No. 09/098,075, filed Jun. 16, 1998.

Final Office Action Mailed Aug. 30, 2000 in Co-pending U.S. Appl. No. 09/098,075, filed Jun. 16, 1998.

Non-Final Office Action Mailed Mar. 16, 2000 in Co-pending U.S. Appl. No. 09/098,075, filed Jun. 16, 1998.

Co-pending U.S. Appl. No. 10/228,680, filed Aug. 26, 2002.

Notice of Allowance Mailed Aug. 19, 2005 in Co-pending U.S. Appl. No. 10/228,680, filed Aug. 26, 2002.

Non-Final Office Action Mailed Apr. 28, 2005 in Co-pending U.S. Appl. No. 10/228,680, filed Aug. 26, 2002.

Non-Final Office Action Mailed Feb. 10, 2005 in Co-pending U.S. Appl. No. 10/228,680, filed Aug. 26, 2002.

Co-pending U.S. Appl. No. 11/100,956, filed Apr. 6, 2005.

Notice of Allowance Mailed Apr. 10, 2009 in Co-pending U.S. Appl. No. 11/100,956, filed Apr. 6, 2005.

Non-Final Office Action Mailed Apr. 7, 2008 in Co-pending U.S. Appl. No. 11/100,956, filed Apr. 6, 2005.

Non-Final Office Action Mailed Sep. 26, 2007 in Co-pending U.S. Appl. No. 11/100,956, filed Apr. 6, 2005.

Co-pending U.S. Appl. No. 10/023,915, filed Dec. 14, 2001.

Notice of Allowance Mailed Jul. 7, 2008 in Co-pending U.S. Appl. No. 10/023,915, filed Dec. 14, 2001.

Advisory Office Action May 30, 2008 in Co-pending U.S. Appl. No. 10/023,915, filed Dec. 14, 2001.

Final Office Action Mailed Jan. 8, 2008 in Co-pending U.S. Appl. No. 10/023,915, filed Dec. 14, 2001.

Non-Final Office Action Mailed Jan. 3, 2007 in Co-pending U.S. Appl. No. 10/023,915, filed Dec. 14, 2001.

Final Office Action Mailed Apr. 5, 2006 in Co-pending U.S. Appl. No. 10/023,915, filed Dec. 14, 2001.

Non-Final Office Action Mailed Jun. 29, 2005 in Co-pending U.S. Appl. No. 10/023,915, filed Dec. 14, 2001.

Co-pending U.S. Appl. No. 11/273,862, filed Nov. 14, 2005.

Final Office Action Mailed Feb. 25, 2010 in Co-pending U.S. Appl. No. 11/273,862, filed Nov. 14, 2005.

Non-Final Office Action Mailed Jun. 8, 2009 in Co-pending U.S. Appl. No. 11/273,862, filed Nov. 14, 2005.

Co-pending U.S. Appl. No. 10/926,635, filed Aug. 25, 2004.

Final Office Action Mailed Dec. 12, 2007 in Co-pending U.S. Appl. No. 10/926,635, filed Aug. 25, 2004.

Non-Final Office Action Mailed Jun. 21, 2007 in Co-pending U.S. Appl. No. 10/926,635, filed Aug. 25, 2004.

Co-pending U.S. Appl. No. 10/988,014, filed Nov. 12, 2004.

Notice of Allowance Mailed Mar. 21, 2007 in Co-pending U.S. Appl. No. 10/988,014, filed Nov. 12, 2004.

Non-Final Office Action Mailed Oct. 16, 2006 in Co-pending U.S. Appl. No. 10/988,014, filed Nov. 12, 2004.

Co-pending U.S. Appl. No. 11/274,442, filed Nov. 14, 2005.
Non-Final Office Action Mailed Dec. 10, 2008 in Co-pending U.S. Appl. No. 11/274,442, filed Nov. 14, 2005.
Co-pending U.S. Appl. No. 11/371,627, filed Mar. 8, 2006.
Non-Final Office Action Mailed Feb. 20, 2008 in Co-pending U.S. Appl. No. 11/371,627, filed Mar. 8, 2006.
Co-pending U.S. Appl. No. 11/388,381, filed Mar. 23, 2006.
Final Office Action Mailed Mar. 29, 2010 in Co-pending U.S. Appl. No. 11/388,381, filed Mar. 23, 2006.
Non-Final Office Action Mailed Dec. 9, 2008 in Co-pending U.S. Appl. No. 11/388,381, filed Mar. 23, 2006.
Co-pending U.S. Appl. No. 09/784,699, filed Jun. 13, 2006.
Notice of Allowance Mailed Dec. 23, 2005 in Co-Pending U.S. Appl. No. 09/784,699, filed Feb. 14, 2001.
Non-Final Office Action Mailed Oct. 3, 2005 in Co-Pending U.S. Appl. No. 09/784,699, filed Feb. 14, 2001.
Final Office Action Mailed Mar. 7, 2005 in Co-Pending U.S. Appl. No. 09/784,699, filed Feb. 14, 2001.
Non-Final Office Action Mailed Jun. 16, 2004 in Co-Pending U.S. Appl. No. 09/784,699, filed Feb. 14, 2001.
Co-pending U.S. Appl. No. 11/453,301, filed Jun. 13, 2006.
Non-Final Office Action Mailed Apr. 7, 2010 in Co-Pending U.S. Appl. No. 11/453,301, filed Jun. 13, 2006.
Non-Final Office Action Mailed Aug. 6, 2009 in Co-Pending U.S. Appl. No. 11/453,301, filed Jun. 13, 2006.
Co-Pending U.S. Appl. No. 09/847,813, filed May 1, 2001.
Final Office Action Mailed Jan. 8, 2008 in Co-Pending U.S. Appl. No. 09/847,813, filed May 1, 2001.
Non-Final Office Action Mailed Jul. 3, 2007 in Co-Pending U.S. Appl. No. 09/847,813, filed May 1, 2001.
Final Office Action Mailed Mar. 16, 2007 in Co-Pending U.S. Appl. No. 09/847,813, filed May 1, 2001.
Non-Final Office Action Mailed Dec. 7, 2006 in Co-Pending U.S. Appl. No. 09/847,813, filed May 1, 2001.
Non-Final Office Action Mailed Jul. 13, 2006 in Co-Pending U.S. Appl. No. 09/847,813, filed May 1, 2001.
Non-Final Office Action Mailed Feb. 16, 2006 in Co-Pending U.S. Appl. No. 09/847,813, filed May 1, 2001.
Final Office Action Mailed Sep. 20, 2005 in Co-Pending U.S. Appl. No. 09/847,813, filed May 1, 2001.
Non-Final Office Action Mailed Feb. 15, 2005 in Co-Pending U.S. Appl. No. 09/847,813, filed May 1, 2001.
Co-Pending U.S. Appl. No. 10/010,147, filed Nov. 6, 2001.
Notice of Allowance Mailed Oct. 28, 2005 in Co-Pending U.S. Appl. No. 10/010,147, filed Nov. 6, 2001.
Non-Final Office Action Mailed Feb. 9, 2005 in Co-Pending U.S. Appl. No. 10/010,147, filed Nov. 6, 2001.
Co-Pending U.S. Appl. No. 11/021,569, filed Dec. 22, 2004.
Non-Final Office Action Mailed Oct. 28, 2008 in Co-Pending U.S. Appl. No. 11/021,569, filed Dec. 22, 2004.
Final Office Action Mailed Mar. 21, 2008 in Co-Pending U.S. Appl. No. 11/021,569, filed Dec. 22, 2004.
Office Action Mailed Sep. 18, 2007 in Co-Pending U.S. Appl. No. 11/021,569, filed Dec. 22, 2004.
Co-Pending U.S. Appl. No. 09/826,607, filed Apr. 5, 2001.
Advisory Action Mailed Oct. 23, 2006 in Co-Pending U.S. Appl. No. 09/826,607, filed Apr. 5, 2001.
Final Office Action Mailed Jun. 19, 2006 in Co-Pending U.S. Appl. No. 09/826,607, filed Apr. 5, 2001.
Non-Final Office Action Mailed Nov. 20, 2005 in Co-Pending U.S. Appl. No. 09/826,607, filed Apr. 5, 2001.
Final Office Action Mailed May 24, 2005 in Co-Pending U.S. Appl. No. 09/826,607, filed Apr. 5, 2001.
Non-Final Office Action Mailed Oct. 6, 2004 in Co-Pending U.S. Appl. No. 09/826,607, filed Apr. 5, 2001.
Co-Pending U.S. Appl. No. 09/827,030, filed Apr. 5, 2001.
Notice of Allowance Mailed Jan. 26, 2005 in Co-Pending U.S. Appl. No. 09/827,030, filed Apr. 5, 2001.
Office Action Mailed Jun. 18, 2004 in Co-Pending U.S. Appl. No. 09/827,030, filed Apr. 5, 2001.
Co-Pending U.S. Appl. No. 09/858,260, filed May 15, 2001.
Notice of Allowance Mailed May 10, 2005 in Co-Pending U.S. Appl. No. 09/858,260, filed May 15, 2001.
Office Action dated Sep. 7, 2004 in Co-Pending U.S. Appl. No. 09/858,260, filed May 15, 2001.
Co-Pending U.S. Appl. No. 10/005,729, filed Nov. 6, 2001.
Final Office Action Mailed Jan. 25, 2010 in Co-Pending U.S. Appl. No. 10/005,729, filed Nov. 6, 2001.
Non-Final Office Action Mailed Mar. 3, 2009 in Co-Pending U.S. Appl. No. 10/005,729, filed Nov. 6, 2001.
Advisory Action Mailed May 8, 2007 in Co-Pending U.S. Appl. No. 10/005,729, filed Nov. 6, 2001.
Final Office Action Mailed Dec. 1, 2006 in Co-Pending U.S. Appl. No. 10/005,729, filed Nov. 6, 2001.
Non-Final Office Action Mailed Nov. 17, 2005 in Co-Pending U.S. Appl. No. 10/005,729, filed Nov. 6, 2001.
Non-Final Office Action Mailed Jun. 7, 2005 in Co-Pending U.S. Appl. No. 10/005,729, filed Nov. 6, 2001.
Non-Final Office Action Mailed Dec. 14, 2004 in Co-Pending U.S. Appl. No. 10/005,729, filed Nov. 6, 2001.
Co-Pending U.S. Appl. No. 09/996,180, filed Nov. 27, 2001.
Office Action Mailed Feb. 24, 2005 in Co-Pending U.S. Appl. No. 09/996,180, filed Nov. 27, 2001.
Co-Pending U.S. Appl. No. 12/062,766, filed Apr. 8, 2008.
Co-Pending U.S. Appl. No. 12/062,789, filed Apr. 8, 2008.

\* cited by examiner

SOFTWARE STREAMING SYSTEM AND METHOD

This Patent Application is a Continuation of U.S. patent application Ser. No. 11/100,956, filed Apr. 6, 2005, entitled "Software Streaming System and Method," which has issued as U.S. Pat. No. 7,577,751, and which is a Continuation of U.S. Pat. No. 7,096,253 filed Aug. 26, 2002, entitled "A Method and Apparatus for Streaming Software," which is a Continuation of U.S. Pat. No. 6,453,334, filed Jun. 16, 1998 entitled "Method and Apparatus to Allow Remotely Located Computer Programs and/or Data to be Accessed on a Local Computer in a Secure, Time-Limited Manner, with Persistent Caching," which claims priority to U.S. Provisional Patent Application No. 60/049,759, filed Jun. 16, 1997, all of which are incorporated herein by reference.

BACKGROUND

Installation of software titles can be time-consuming and the installation requirement prevents immediate execution of the software title. The purchaser of a software title generally has to install the software title before the software title can be executed. This can be a time-consuming and frustrating endeavor.

If a person finds software on the Internet or a bulletin board, he or she must often follow current download methods which includes, for example, downloading a zipped file, which the subscriber must unzip and install, requiring minutes to accomplish. Execution does not occur until the zipped file or the entire set of files associated with a software title is downloaded to a local machine.

Piracy looms large in the software industry; it is fairly easy to copy and install software multiple times. Encryption techniques are needed to limit illegal use of software titles.

SUMMARY

In various embodiments, one or more of the above-mentioned problems have been reduced or eliminated.

In a non-limiting embodiment, a method for streaming software may include downloading blocks associated with a software title until an executable threshold is reached, initiating execution of the software title, and continuing to blocks of the software title while the software title is executed. By way of example but not limitation, the method may further include logging on to a server site, selecting the software title for download, receiving a dependency string-which may include executables and/or DLLs, generating a start message generally contemporaneously with initiating execution of the software title, and/or generating an end message generally contemporaneously with completing execution of the software title. By way of example but not limitation, the method may further include requesting data, associated with the software title, that is available at a remote location; suspending execution of the software title; downloading blocks associated with the requested data; and resuming execution of the software title with the requested data.

In another non-limiting embodiment, a method for streaming software may include sending to a client data sufficient for the client to build a virtual directory structure for use in executing a software title, streaming a subset of blocks associated with the software title to the client, and streaming additional blocks associated with the software title to the client on demand. By way of example but not limitation, the method may further include preparing the software title for streaming; creating an index containing information about registry changes, files, and directories created; creating an index for used by a client-side file system driver to present the virtual directory structure to the client; receiving a request for the software title; sending a dependency string to the client; receiving a start message associated with a start of execution of the software title; receiving a stop message associated with an end to execution of the software title; uploading a client shell installation program to the client; verifying that the client is a subscriber; and/or generating a session.

In another non-limiting embodiment, a system for streaming software may include a server computer and a client computer. By way of example but not limitation, the server computer may include memory with a program database and a streaming engine stored therein, a processor, and a communication interface for forwarding data with respect to a network. By way of example but not limitation, the client may include memory with a client shell and a cache stored therein, a processor, and a communication interface for forwarding data with respect to the network. In a non-limiting embodiment, in operation the streaming engine may stream an executable streaming application from the program database to the client. In a non-limiting embodiment, in operation the client shell stores at least some of the executable streaming application in the cache. The executable streaming application may or may not be executed prior to receiving the entire executable streaming application.

BRIEF DESCRIPTION OF THE FIGURES

Embodiments of the invention are illustrated in the figures. However, the embodiments and figures are illustrative rather than limiting; they provide examples of the invention.

DETAILED DESCRIPTION

Figure 1:
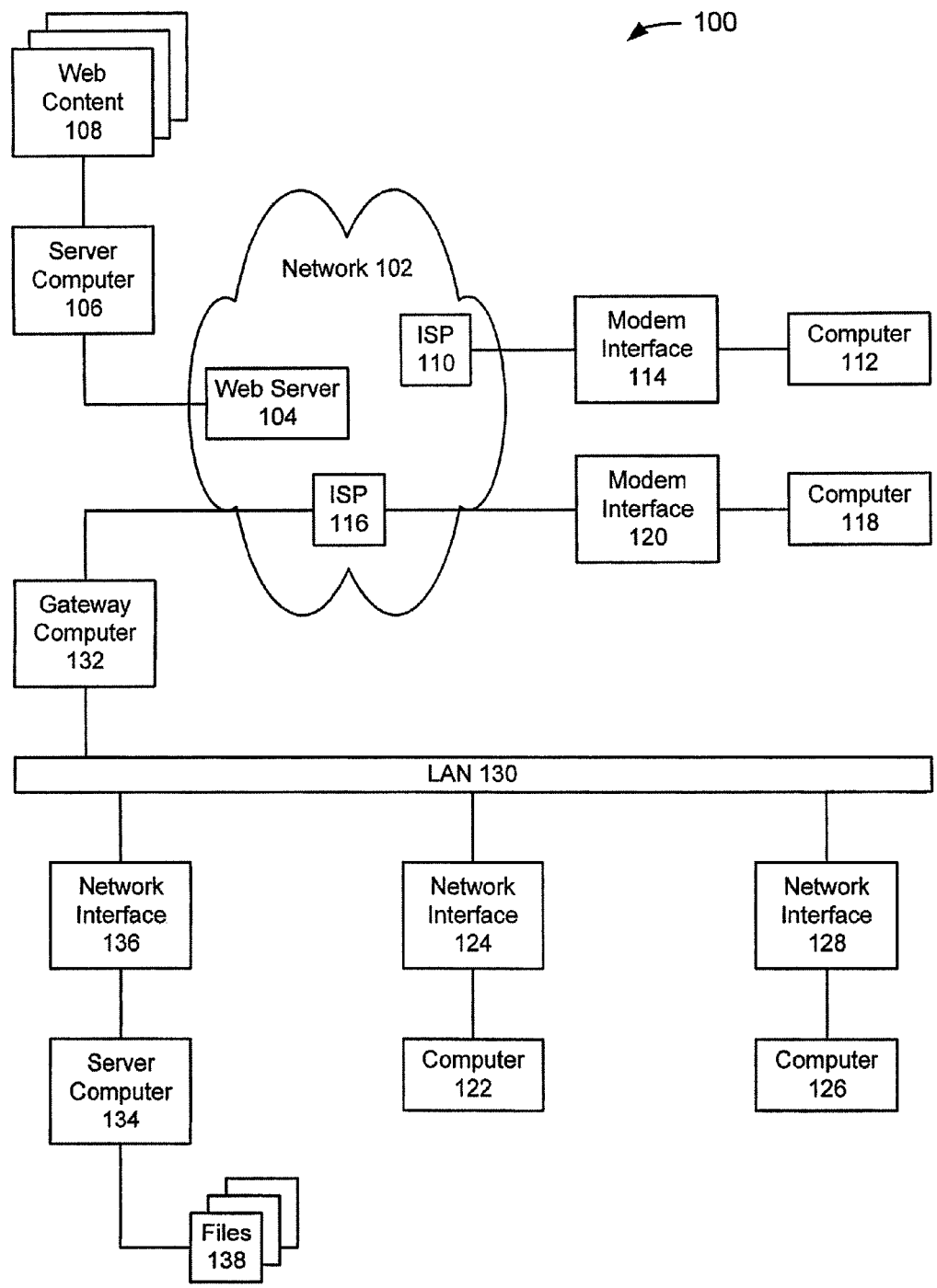
FIGS. 1 and 2 depict an example of a computer system environment suitable for practicing various embodiments.
Figure 2:
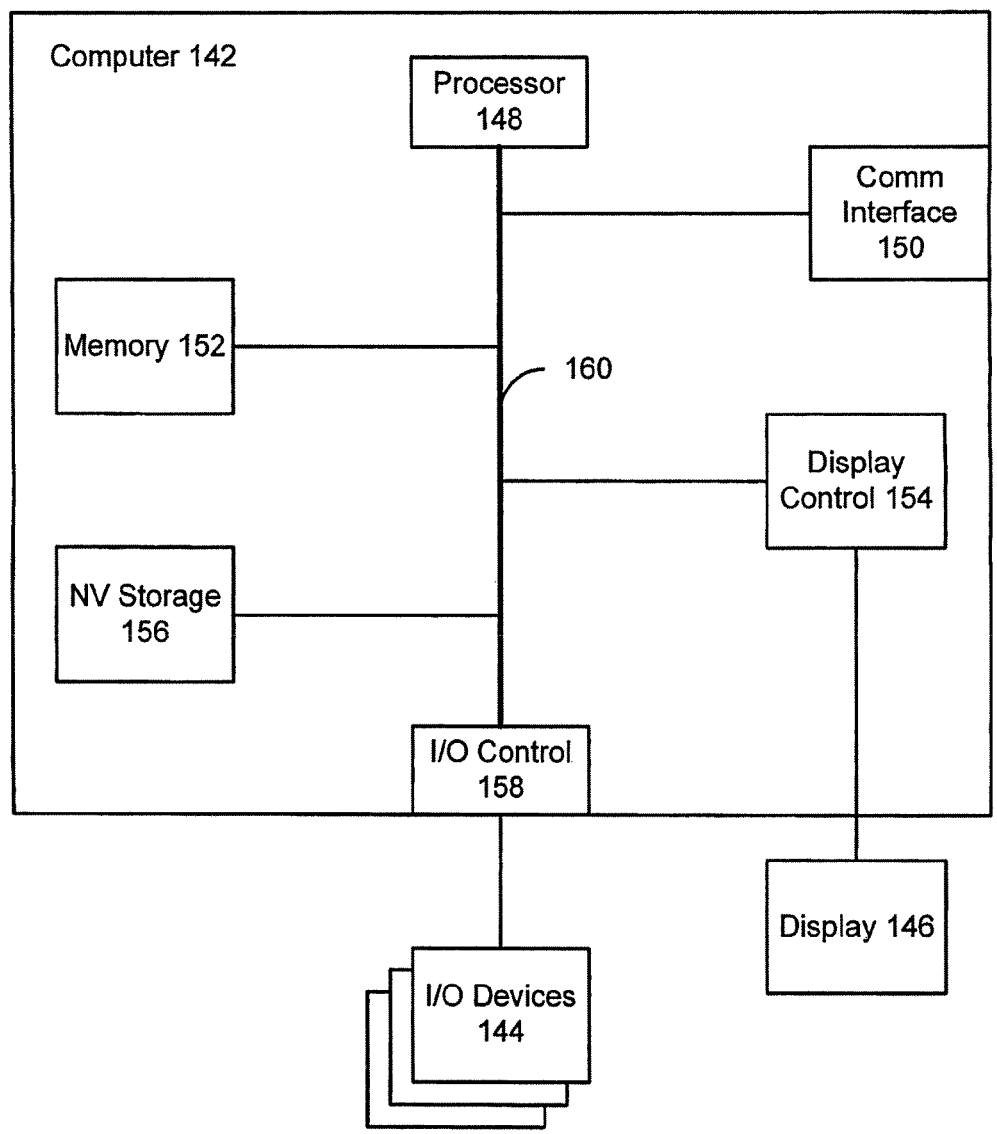

The following description of FIGS. 1 and 2 is intended to provide an overview of computer hardware and other operating components suitable for performing the various methods and embodiments of the invention described herein, but is not intended to limit the applicable environments. Similarly, the computer hardware and other operating components may be suitable as part of the apparatuses of the various embodiments described herein. Applicable environments may include other computer system configurations, including hand-held devices, multiprocessor systems, microprocessor-based or programmable consumer electronics, network PCs, mini-computers, mainframe computers, and the like. Applicable environments may include distributed computing environments where tasks are performed by remote processing devices that are linked through a communications network.

FIG. 1 depicts a networked system 100 that includes several computer systems coupled together through a network 102, such as the Internet. The term "Internet" as used herein refers to a network of networks which uses certain protocols, such as the TCP/IP protocol, and possibly other protocols such as the hypertext transfer protocol (HTTP) for hypertext markup language (HTML) documents that make up the World Wide Web (the web). The physical connections of the Internet and the protocols and communication procedures of the Internet are well known to those of skill in the art.

The web server 104 is typically at least one computer system which operates as a server computer system and is configured to operate with the protocols of the world wide web and is coupled to the Internet. The web server system 104 can be a conventional server computer system. Optionally, the web server 104 can be part of an ISP which provides access to the Internet for client systems. The web server 104 is shown coupled to the server computer system 106 which itself is coupled to web content 108, which can be considered a form of a media database. While two computer systems 104 and 106 are shown in FIG. 1, the web server system 104 and the server computer system 106 can be one computer system having different software components providing the web server functionality and the server functionality provided by the server computer system 106, which will be described further below.

Access to the network 102 is typically provided by Internet service providers (ISPs), such as the ISPs 110 and 116. Users on client systems, such as client computer systems 112, 118, 122, and 126 obtain access to the Internet through the ISPs 110 and 116. Access to the Internet allows users of the client computer systems to exchange information, receive and send e-mails, and view documents, such as documents which have been prepared in the HTML format. These documents are often provided by web servers, such as web server 104, which are referred to as being "on" the Internet. Often these web servers are provided by the ISPs, such as ISP 110, although a computer system can be set up and connected to the Internet without that system also being an ISP.

Client computer systems 112, 118, 122, and 126 can each, with the appropriate web browsing software, view HTML pages provided by the web server 104. The ISP 110 provides Internet connectivity to the client computer system 112 through the modem interface 114, which can be considered part of the client computer system 112. The client computer system can be a personal computer system, a network computer, a web TV system, or other computer system. While FIG. 1 shows the modem interface 114 generically as a "modem," the interface can be an analog modem, isdn modem, cable modem, satellite transmission interface (e.g. "direct PC"), or other interface for coupling a computer system to other computer systems.

Similar to the ISP 114, the ISP 116 provides Internet connectivity for client systems 118, 122, and 126, although as shown in FIG. 1, the connections are not the same for these three computer systems. Client computer system 118 is coupled through a modem interface 120 while client computer systems 122 and 126 are part of a LAN 130.

Client computer systems 122 and 126 are coupled to the LAN 130 through network interfaces 124 and 128, which can be Ethernet network or other network interfaces. The LAN 130 is also coupled to a gateway computer system 132 which can provide firewall and other Internet-related services for the local area network. This gateway computer system 132 is coupled to the ISP 116 to provide Internet connectivity to the client computer systems 122 and 126. The gateway computer system 132 can be a conventional server computer system.

Alternatively, a server computer system 134 can be directly coupled to the LAN 130 through a network interface 136 to provide files 138 and other services to the clients 122 and 126, without the need to connect to the Internet through the gateway system 132.

FIG. 2 depicts a computer system 140 for use in the system 100 (FIG. 1). The computer system 140 may be a conventional computer system that can be used as a client computer system or a server computer system or as a web server system. Such a computer system can be used to perform many of the functions of an Internet service provider, such as ISP 110 (FIG. 1). The computer system 140 includes a computer 142, I/O devices 144, and a display device 146. The computer 142 includes a processor 148, a communications interface 150, memory 152, display controller 154, non-volatile storage 156, and I/O controller 158. The computer system 140 may be couple to or include the I/O devices 144 and display device 146.

The computer 142 interfaces to external systems through the communications interface 150, which may include a modem or network interface. It will be appreciated that the communications interface 150 can be considered to be part of the computer system 140 or a part of the computer 142. The communications interface can be an analog modem, isdn modem, cable modem, token ring interface, satellite transmission interface (e.g. "direct PC"), or other interfaces for coupling a computer system to other computer systems.

The processor 148 may be, for example, a conventional microprocessor such as an Intel Pentium microprocessor or Motorola power PC microprocessor. The memory 152 is coupled to the processor 148 by a bus 160. The memory 152 can be dynamic random access memory (DRAM) and can also include static ram (SRAM). The bus 160 couples the processor 148 to the memory 152, also to the non-volatile storage 156, to the display controller 154, and to the I/O controller 158.

The I/O devices 144 can include a keyboard, disk drives, printers, a scanner, and other input and output devices, including a mouse or other pointing device. The display controller 154 may control in the conventional manner a display on the display device 146, which can be, for example, a cathode ray tube (CRT) or liquid crystal display (LCD). The display controller 154 and the I/O controller 158 can be implemented with conventional well-known technology.

The non-volatile storage 156 is often a magnetic hard disk, an optical disk, or another form of storage for large amounts of data. Some of this data is often written, by a direct memory access process, into memory 152 during execution of software in the computer 142. One of skill in the art will immediately recognize that the terms "machine-readable medium" or "computer-readable medium" includes any type of storage device that is accessible by the processor 148 and also encompasses a carrier wave that encodes a data signal.

The computer system 140 is one example of many possible computer systems which have different architectures. For example, personal computers based on an Intel microprocessor often have multiple buses, one of which can be an I/O bus for the peripherals and one that directly connects the processor 148 and the memory 152 (often referred to as a memory bus). The buses are connected together through bridge components that perform any necessary translation due to differing bus protocols.

Network computers are another type of computer system that can be used with the present invention. Network computers do not usually include a hard disk or other mass storage, and the executable programs are loaded from a network connection into the memory 152 for execution by the processor 148. A Web TV system, which is known in the art, is also considered to be a computer system according to the present invention, but it may lack some of the features shown in FIG. 2, such as certain input or output devices. A typical computer system will usually include at least a processor, memory, and a bus coupling the memory to the processor.

In addition, the computer system 140 is controlled by operating system software which includes a file management system, such as a disk operating system, which is part of the operating system software. One example of operating system software with its associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage 156 and causes the processor 148 to execute the various acts required by the operating system to input and output data and to store data in memory, including storing files on the non-volatile storage 156.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Some embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language, and various embodiments may thus be implemented using a variety of programming languages.

According to an embodiment, subscribers can access a software title on demand. By way of example but not limitation, a subscriber can "rent" a software title, instead of using conventional distribution channels to supply media/hardcopy/boxes on store shelves. A non-limiting embodiment includes a client-server architecture/platform to serve streaming software or software-on-demand over a network, such as the Internet.

In another non-limiting embodiment, subscribers can rent software titles. The software titles may already be pre-configured so there is little to no installation issues for the subscriber. By way of example but not limitation, a pre-configured software may be pre-configured according to the following non-limiting technique:

The software title is first installed on a clean system on which the contents of the registry are known, and all files prior to the installation of the target program are known. (The description is, for illustrative purposes only, in the context of a Windows 95-type system.) By knowing the state of the machine before the installation of the target program, changes made to the install machine caused by the installation of the software title can be determined. It is sometimes required to run the software title on the install system so that any final installation steps needed by the software title can be determined. This need may be determined manually on a case-by-case basis. Of course, this could also be determined automatically using an appropriately configured utility. A clean install system may be a stand-alone computer, or an application environment that is virtually isolated from other components.

Next, the software title is preprocessed. The purpose of the preprocessing phase in a non-limiting embodiment is twofold: To create an index containing information about all the registry changes, files, and directories created by the installation of the software title, and to break-up the program and all its data into "chunks" which are then encrypted, compressed, and placed on the runtime server. These chunks may be referred to as blocks.

According to a non-limiting embodiment, the preprocessing technique brings the software title to an on-demand client by utilizing a manual or automated utility to preprocess the software title. The utility records which files of the software title are installed and how the registry is used. Unlike a standard installer package, the utility analyzes how the software title is actually executed after installation.

The index is used by the client-side file system driver (hereafter the FSD) to present a virtual directory structure to the client machine, including all file properties (file size, last modification time, etc.) and the overall directory structure. The blocks are downloaded by the FSD and cached, decompressed, and decrypted, on an as-needed basis, during the execution of the software title on the client machine. In a non-limiting embodiment, the files are broken into compressed, encrypted blocks in a preprocessing phase, rather than during runtime, to improve runtime performance. In another non-limiting embodiment, the index also contains the information used by the FSD to compute which block to download at runtime as it is needed. In this way, the utility prepares the software title for streaming and stores the associated files on a server.

In another embodiment, after initializing the index to be empty, the record registry changes are implemented. Then, the record file and directory changes are implemented. In a non-limiting embodiment, this may include adding the directory/file to the index. Additional information may include, by way of example but not limitation, file creation time, last modification time, last access time, file size, short form of the name, and long form of the name. The location of the file/directory in the overall directory hierarchy may also be recorded, using an appropriate tree data structure. Some additional fields which are later filled-in by the runtime system may be zeroed out during preprocessing. A unique ID may also be assigned to each file, and stored in the index, which may later be used by the FSD to calculate which block to download when the contents of that region of the file are needed by the runtime. If the file is not a directory the file may also be broken into blocks and the blocks may be written to individual files on the on-demand server.

In a non-limiting embodiment, in addition to the registry and file/directory changes recorded in the index, the index may also contain the client version number, the software title version number, an expiration date for the index file, a program ID identifying the software title that is used when contacting the authentication server, the directory on the runtime server containing the blocks, and the virtual command line containing the program component that contains the image of the program that is to be used to create the runnable process on the client machine as well as any command line arguments to that program.

Once the software title is ready for streaming, the software title can be stored on the server. When a user requests the software title, the software title is streamed to the client shell and execution begins. Initially, the software title components that are sent to the client shell include executables and DLLs that are necessary for execution, which may be referred to as the components of a "dependency string." After the necessary components have been received, the server sends additional components on-demand. Advantageously, a subscriber, this process is transparent. Since the software titles are preprocessed on a clean system, the software titles have their own virtual registry and DLLs.

In another non-limiting embodiment, software developers may or may not share revenue based on subscriber usage, which is tracked by company's database. Subscriber usage may be measured, for example, by determining a start time and an end time for each time period during which a software title is executing, and incrementing a time period counter according to the length of the time periods.

In another non-limiting embodiment, an encryption process prevents illegal use of the streaming software. This may result in more security towards a software package then current methods of purchasing floppies and CDs.

A non-limiting embodiment includes a store front at which subscribers can purchase streaming software. In other embodiments, chat rooms, and any other Internet-type related activity may be included. In another embodiment, contests between subscribers may be included.

Figure 3:
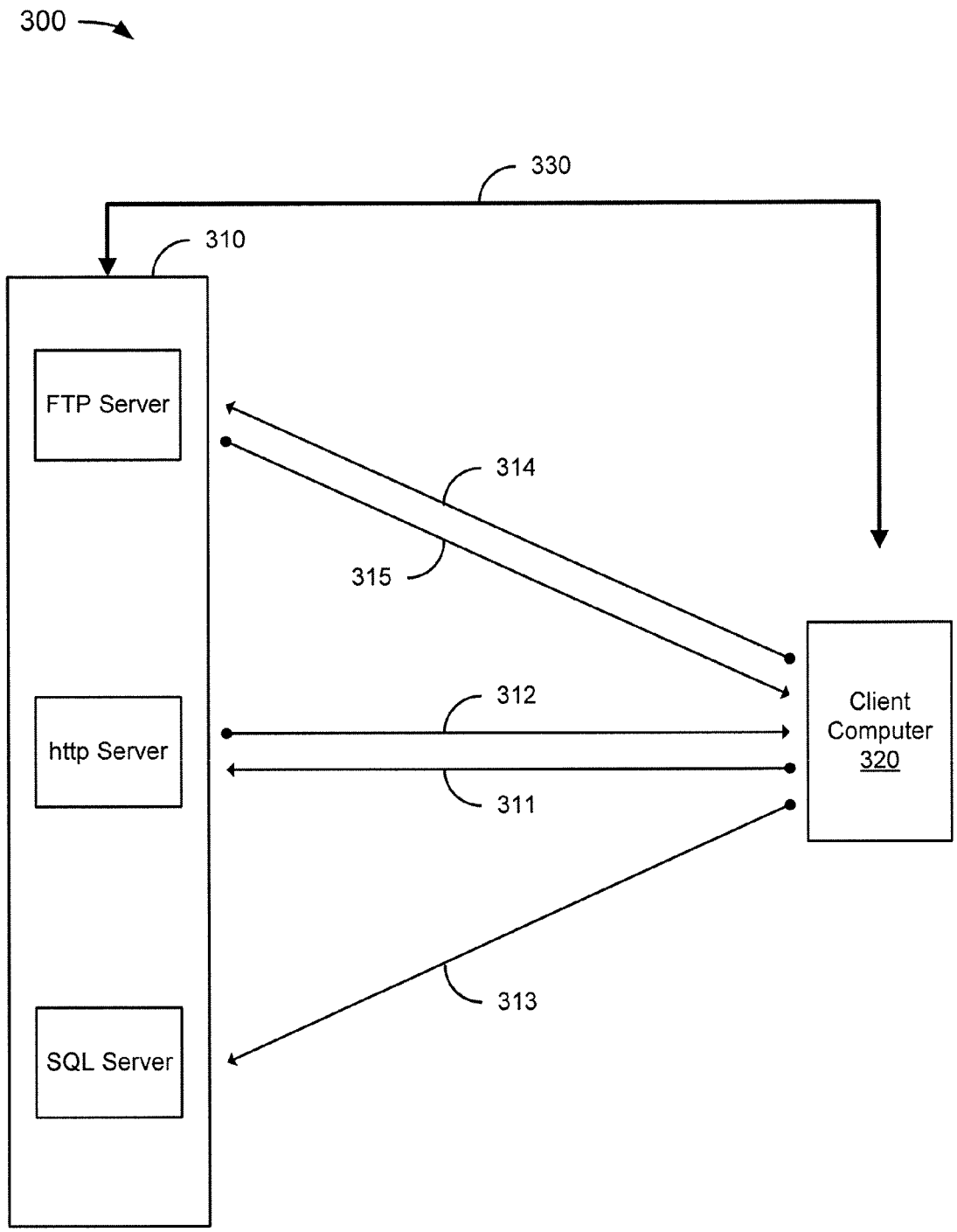
FIG. 3 depicts a client-server streaming software system according to an embodiment.

FIG. 3 depicts a client-server streaming software system 300 according to an embodiment. The system 300 includes a server 310, which may include an FTP server, an HTTP server, and an SQL server and a client 320, which may include a client shell and a cache. In a non-limiting embodiment, the system 300 includes a client server model based on, by way of example but not limitation, Windows NT and IIS/FTP services. One of skill in the art should recognize that, in various embodiments, the system 300 can be used to serve legacy DOS, Windows, or any other software products.

The server 310 may include a high performance NT server machine or collection of machines. An ISAPI interface prototype that included Web extensions to NT's IIS Web Server was completed in June 1996. Accordingly, other components may include NT's IIS. Other components may also include FTP services and a high performance ODBC database. These extensions may interface to a database, or communicate with the client 320.

IIS Extensions (e.g., ISAPI Extensions) have an associated message structure that may vary with new versions. In a non-limiting embodiment, the ISAPI extensions reside in a .dll file on the server 310. By way of example but not limitation, ISAPI extensions may reside on an http server associated with the server 310. The extensions, residing in a .dll type file, can be called from a client shell program on the client 320. By way of example but not limitation, the client shell calls a .dll to record or query data to and from a database. The .dll facilitates generating an interface with the database. In an embodiment, the client shell creates, by way of example but not limitation, an HTTP string. In general, the .dll returns an HTTP string with either an error message or an appropriate return argument. The message protocol, according to a non-limiting embodiment, is HTTP over TCP/IP.

The following methods are examples of messages that could be used according to a non-limiting embodiment. The following method is called to create and update subscriber's personal profile in company's database.

```
LoadMemberBilling(LPCTSTR  player_name,
LPCTSTR                    password,
LPCTSTR                    firstname,
LPCTSTR                    lastname,
LPCTSTR                    streetaddress,
LPCTSTR                    city,
LPCTSTR                    state,
LPCTSTR                    zip,
LPCTSTR                    country,
LPCTSTR                    ccnumber,
LPCTSTR                    ocexpdate,
LPCTSTR                    name_on_cc,
LPCTSTR                    tele,
LPCTSTR                    fax,
LPCTSTR                    email);
```

The message:

LogontoGWserver(LPCTSTR username, LPCTSTR password);

returns sessionID is called by the client shell after a subscriber enters a valid playername and password. The database is checked for these two items, as well as if the account is deactived, or if account is already logged on.

The message:

GetGameStream(LPCTSTR gametitle);

returns dependencystring is called by client shell to retrieve a file dependency string and a minimum number of files required for the main executable to start executing. This gets called after a subscriber selects a particular software title from website.

The message:

StartGameClock(LPCTSTR sessionID, LPCTSTR gametitle, LPCTSTR, playername);

returns gameID is called by client shell when minimum number of files have been downloaded to a local machine and a software title starts executing.

The message:

StopGameClock(LPCTSTR sessionID, LPCTSTR gameID);

is called when a software title terminates.

The message:
   LogoffGWserver(LPCTSTR sessionID);
is called by the client shell to logoff a subscriber. Subscriber logon time is tracked in the database.

The message:
   LogErrorsMsg(LPCTSTR errormsg)
is called when issues and errors need to be recorded in the database.

The server 310 and the client 320 are coupled to one another through a network, such as a network described by way of example but not limitation with reference to FIG. 1. A connection is represented in FIG. 3 as a bi-directional arrow 330. A connection between the server 310 and the client 320 could be accomplished as described by way of example but not limitation with reference to FIG. 1.

In certain embodiments, an Intranet-type network may be added to the system 300. Accordingly, in a non-limiting embodiment, the client may be part of an enterprise's LAN and download performance can be at LAN (e.g., Ethernet or Token Ring) speeds. Other messages, such as external database queries and logging messages related to streaming software could be sent to a remote (e.g., Internet) site, depending upon the embodiment. The system 300 may include distributed processing, as streaming software file resources are stored on an intranet, while requiring database-type messages always go back to a database server. Naturally, the database server could also be part of the intranet, though this may be inappropriate in an embodiment where the database server is managed by a party that does not own the intranet.

A series of transactions between the server and client are represented as the uni-directional arrows 311, 312, 313, 314, and 315. It should be noted that each transaction may or may not be accomplished as a single transaction or a series of bi-directional transactions, such as handshake or verification procedures that involve transmissions and replies. For illustrative purposes only, however, the transactions are described as if they are uni-directional in character.

The transaction 311 includes generating an HTTP request for a program by clicking on a program link. In secure embodiments, a system's user interface was replaced with web pages so that a subscriber could select software titles from a web page. Of course, alternative embodiments could be used, such as the fixed user interface that the web page implementation replaced, or other mechanisms for selecting software titles.

In a non-limiting embodiment, a software title link may be, by way of example but not limitation, a hypertext link from a list of available software titles displayed on a web page. In an exemplary embodiment, a user at the server 310 accesses a web page associated with the client 320 using, by way of example but not limitation, a browser such as Internet Explorer®. The user selects a link that is associated with a particular software title. The selection causes the client 320 to generate, by way of example but not limitation, an HTTP request.

The transaction 312 follows the generation of, for example, the HTTP request. The transaction 312 may include downloading, by way of example but not limitation, a token file at the server 310 followed by other procedures. The other procedures may include, by way of example but not limitation, the token file activating client software if the client software is not already running, a procedure wherein the user logs in to a database, and a procedure wherein the client software is instructed which program is requested.

The transaction 313 may include, by way of example but not limitation, querying a database, such as an SQL database accessible to an SQL server, and other procedures. The other procedures may include, by way of example but not limitation, establishing a session ID, querying a program ID in the database, selecting a dependency string associated with the program, sending the dependency string to the server 310, and entering billing information including, for example, the user's name, session ID, IP address, and program ID into a billing table. It may be noted that a dependency algorithm was devised in August 1996 to improve the speed with which a streaming program could be executed (providing the essential files first) and the general performance (providing soon-to-be-needed files next). The dependency algorithm obviated hard-coding a dependency string in a client shell, thereby relieving the need to keep updating the client shell as new streaming software became available. It should be noted, however, that one of skill in the art would note that the streaming system could be utilized without a downloadable dependency string. Indeed, the files could simply be downloaded to a local file structure for execution by the client shell thereon. However, this reduces some of the advantages associated with fast execution of a software title.

The transaction 314 may include, by way of example but not limitation, requesting files associated with the program. The request for files is sent from the server 310 to the client 320. The request may be sent, by way of example but not limitation, to an FTP server, or some other file server.

The transaction 315 may include, by way of example but not limitation, sending files from the client 320 to the server 310, and other procedures. The other procedures may include, by way of example but not limitation, execution of the files midstream, receiving the remaining files just-in-time, suspending program execution to request a file if the file has not yet arrived, resuming execution when the file arrives, uncompressing and decrypting files in memory as the files are "used", and re-initiating transaction 315 at any time. Multiple programs may be run simultaneously. Accordingly, multiple transactions 315 could be simultaneously carried out.

The files, also referred to as blocks, may be individual pieces of a streaming software package. Files reside on the server 310 until a subscriber chooses to run streaming software. The appropriate files are downloaded from the server 310 to the client 320 according to a streaming software procedure. A streaming software package can contain at least one file, which may be executable, and many auxiliary dependent files, which may or may not be executable. The files may be encrypted for security purposes and compressed for reduced download time to the client 320.

Figure 4:
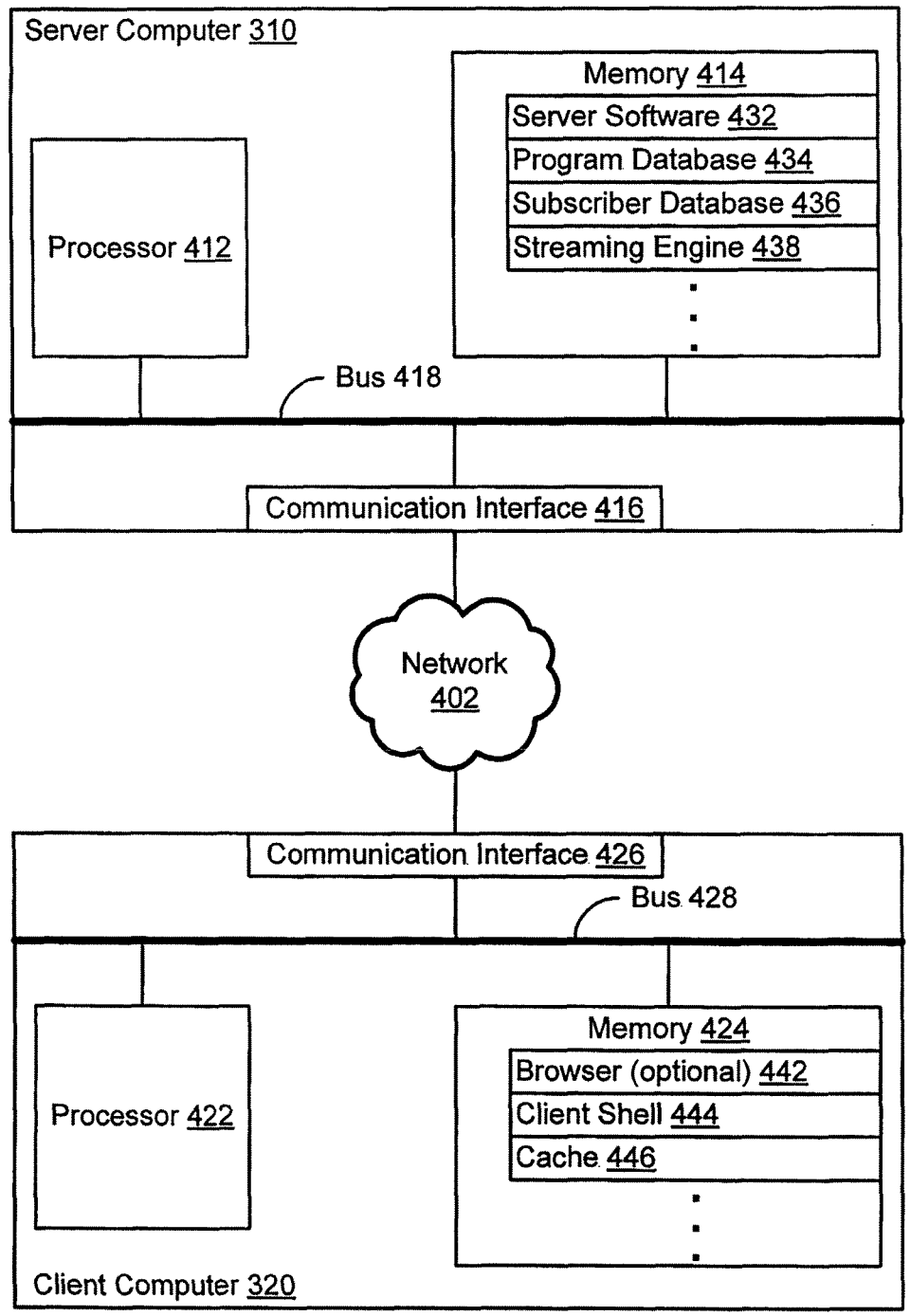
FIG. 4 depicts an alternative representation of the client-server streaming software system of FIG. 3.

FIG. 4 depicts an alternative representation of the system 300. In the example of FIG. 4, the system 300 includes the server 310 and the client 320, coupled to a network 402. In a non-limiting embodiment, the server 310 includes a processor 412, memory 414, a communication interface 416, each of which is coupled to a bus 418. In a non-limiting embodiment, the client 320 includes a processor 422, memory 424, a communication interface 426, each of which is coupled to a bus 428. The communication interfaces 416, 426 facilitate communication between the server 310 and the client 320 through the network 402. It should be noted that the server 310 could comprise multiple separate machines or a single machine. For example, the server 310 could include a proxy server or a communication server.

In the example of FIG. 4, the memory 414 of the server 310 includes server software 432, a program database 434, a subscriber database 436, and a streaming engine 438. The memory could, of course, include other software modules or procedures, such as an operating system, drivers, and the like, as is well-known in the computer-related arts. Indeed, the modules, such as the server software 432, could be incorporated into one or more software modules, such as the operating system.

The server software 432 may or may not include multiple server software components associated with, by way of example but not limitation, an FTP server, an HTTP server, and/or an SQL server. The server software 432 may include, by way of example but not limitation, Windows NT Server using the IIS and FTP services. In a non-limiting embodiment, the server software 432 is associated with each of the transactions 311 to 315 of FIG. 3.

The program database 434 may or may not include multiple software titles, token files associated with the software titles, and blocks or files for streaming. Software titles are stored on the server 310, and streamed to the client 320 (or a client shell) on demand as a subscriber requests them. According to a non-limiting embodiment, a streaming technology involves facilitating execution of a software title before the entire software title has been downloaded. Advantageously, the subscriber no longer has to download an entire set of files before running a streaming title. This may mean that the subscriber can run a program up to 3-5 times faster. It should be noted that unmodified software titles may also be used if startup execution speed is not a factor or if associated costs are deemed too high. Indeed, the dependency string features were not even incorporated into the prototype initially.

By way of example but not limitation, the technique may involve the following. It may be noted that this process can be carried out manually or automated using a software program.

Ordering records files used by the software title.

Encrypting executable files and any other deemed-sensitive files. This encryption prevents the subscriber from running the software title illegally (e.g., when not connected to the company's server), or protects against other hacking or deviant intentions a subscriber may try.

Compressing the files and copying the files to the server with relative directory paths maintained. Compressed files take less time to download from a server to a subscriber's local machine.

Creating a string of this dependency order and inserting the dependency string into the database. This allows a client shell to query for the dependency string, and then download the appropriate files in order. This facilitates running the software title before the entire package is downloaded.

Creating a token file for a webpage object and copying the token file to the server. This token is activated when a subscriber clicks on the associated link, http'ed down to local machine, and passed to a client shell program. This mechanism allows the client shell to determine what software title the subscriber just selected on the webpage.

In a non-limiting embodiment, the program database 434 is accessed in, or otherwise associated with, the transactions 311 to 315 of FIG. 3.

The subscriber database 436 may or may not include information such as subscriber identification data, subscriber login times, software streaming times, a time period during which streaming is allowed (subscription-based), the amount of time purchased (usage-based), cumulative time spent streaming various titles (possibly sub-categorized by title), billing information, or other data. A "subscriber", as used herein, may refer to a user who has a subscription-based service (e.g., access to streaming services is allowed for a specific period of time) or a time-based service (e.g., access to streaming services is paid for on an hourly, or other time-period, basis). A subscriber may purchase time in advance, or be billed for time spent after streaming a title. Profiles may be kept about subscriber machines (e.g., the client 320), saving a subscriber the action of installing streaming software. The profiles may facilitate execution of the streaming software on known machines (e.g., the client 320) that perhaps don't have all necessary equipment, like a sound card for example.

In certain embodiments, messaging between the server 310 and client 320 may be used to track software usage time and login session details. The subscriber database 436 may include information about previous subscribers, inactive subscribers, and potential subscribers, in addition to active subscribers. Billing subscribers may be accomplished in several ways. By way of example, the subscriber may have a monthly subscription rate, an hourly rate, or a per-software title instance rate.

If a subscriber has a monthly subscription rate, then the subscriber database 436 may include a start time and an end time. When the subscriber attempts to stream a title, the database is consulted to determine if the subscriber is attempting to stream the software title at a specific time that is between the start time and end time of the subscription. Obviously, the subscription end time could be more or less than a month in alternative embodiments.

If a subscriber has an hourly rate, then the subscriber database 436 may include a start time and an end time that is associated with a streaming session. For billing purposes, the period between the start time and end time is added to similar periods of time to determine total usage. It may be noted that different software titles may or may not have different hourly rates.

If the subscriber has a per-software title instance rate, then the subscriber database 436 may include a set of software title identifiers that the subscriber is allowed access to. When the subscriber attempts to stream a title, the subscriber database 436 is consulted to determine if the subscriber is attempting to stream a software title for which the subscriber has paid.

The above examples of billing policies may be combined with one another and/or with other known billing policies. In another non-limiting embodiment, subscriber usage of each software title is tracked. The usage may be tracked on a per second basis from all subscribers. Revenues associated with the software title may be split based upon the tracked usage. The more seconds the software title "acquires" (from subscribers running that package), the more revenue a, for example, software developer associated with the software title will receive.

The following is a non-limiting embodiment of a subscriber streaming software session. When a subscriber selects a software title, a login dialog appears on the subscriber's local machine. The subscriber enters a valid playername and password combination. The client sends this information back to the subscriber database 436, and the combination is validated. A unique session ID is generated, and start login time is recorded into the subscriber database 436. Assuming the subscriber enters a valid combination, the subscriber is ready to select a software title. Once a software title is selected, the client shells starts downloading appropriate files. Once the minimum set of files is resident on the local machine, the software is executed/run. A session start time message is sent to the subscriber database 436. If the software terminates, a stop time message is sent to the subscriber database 436. This accurately tracks subscription usages for revenue distribution to streaming software clients. The client shell allows subscribers to logout at any time, which generates a logout message that is sent to the subscriber database 436.

In a non-limiting embodiment, the subscriber database 436 is accessed in, or otherwise associated with, the transactions 312 to 315 of FIG. 3. It should be noted that although the program database 434 and the subscriber database 436 are described separately, the two databases could be merged into a single database. Alternatively, the two databases could be split into three or more databases. For example, a non-limiting embodiment may include the following tables as part of a database:

Error_Messages Table

| | |
|---|---|
| ID | number |
| Timestamp | Date/Time |
| Error | text |

Software_ID Table

| | |
|---|---|
| Unique Game | text |
| Software Name | text |
| Stream | text |

Software_Usage Table

| | |
|---|---|
| Unique Session | text |
| Player Name | text |
| Unique Game | text |
| Session Start Time | date/time |
| Session Stop Time | date/time |
| Elapsed Time | number (in seconds) |

Member_Billing Table

| | |
|---|---|
| Player Name | text |
| password | text |
| disabled? | Binary yes/no |
| already logged on? | Binary yes/no |
| Activation Date | date/time |
| Deactivation Date | date/time |
| First Name | text |
| Last Name | text |
| Street Address | text |
| City | text |
| State | text |
| zip code | text |
| Country | text |
| Credit Card Number | number |
| Credit Card Expiration Date | date/time |
| Name on Credit Card | text |
| telephone number | text |
| fax number | text |
| email address | text |

Member_Mktg_Info Table

| | |
|---|---|
| Player Name | text |
| Age | number |
| Education Level | number |
| Occupation | text |
| Income level | number |

-continued

Member_Mktg_Info Table

| | |
|---|---|
| Sex | text |
| Internet hours | number |
| Preferred Game | text |
| Magazine 1 | text |
| Magazine 2 | text |
| Magazine 3 | text |
| Magazine 4 | text |

Service_Usage Table

| | |
|---|---|
| Unique Session | text |
| Player Name | text |
| Login Time | date/time |
| Logout Time | date/time |
| Elapsed Time | number (seconds) |
| IP Address | text |

The streaming engine 438 determines the best way to stream the files downloaded from server to client, which allows a subscriber to run streaming software before entire package is downloaded. The performance of the streaming engine 438 may be improved by streaming software pre-processing techniques. By way of example but not limitation, streaming software pre-processing may include determining a file dependency order and recording the information into server database (a client may request this information). To arrive at the dependency order, the executable of the software is copied into a new directory with no other files. This executable is executed, and if an error dialog appears, it will describe the dependency file that the main executable is requiring. That dependency file is copied into the directory with the main executable. The main executable is executed, and again if an error dialog appears, it will state the dependency file it requires. This is performed over and over again, until the main executable actually executes and starts running. Another pre-processing technique is file compression. This technique is well-known in the computer-related arts. Another pre-processing technique is to determine the number of files that are required for a program to run. This technique facilitates execution of the program prior to downloading the entire package. The streaming engine 438 is associated with the transactions 314 and 315 of FIG. 3.

In the example of FIG. 4, the memory 424 of the client 320 includes an operating system 442, a client shell 444, a cache 446, and an optional browser 448. The memory could, of course, include other software modules or procedures, such as drivers and the like, as is well-known in the computer-related arts.

The operating system 442 may include, by way of example but not limitation, Windows 95 (and subsequent releases), Windows NT, or some other operating system.

The client shell 444 facilitates access by the server 310, either directly or indirectly, to resources on the client 320. Conceptually, the client shell 444 acts as a layer between the software title and the operating system 442. Thus, a software title that is streamed to the client shell has its own virtual environment including a virtual registry and virtual DLLs. The client shell 444 makes a file system associated with the streaming program on the client 320 available for access. By granting control to the client shell 444, the client shell 444 can execute streaming software in a secure manner. The client shell 444 is executed on the client 320.

Advantageously, the client shell 444 can execute streaming software before all the blocks or files associated with the streaming program are downloaded to client 320. The streaming software is executed once the client 320 has downloaded a certain number of files. In a non-limiting embodiment, the client shell 444 continues to download files as a background task while streaming software is executing.

In certain embodiments, streaming software execution may be suspended to download a needed block. Thus, if the streaming software "needs" a file resource that is not yet downloaded, the client shell 444 may, by way of example but not limitation, trap the error message and parse out the filename that is needed or missing. For example, in a non-limiting embodiment, the client shell 444 may call, by way of example but not limitation, CreateProcess( ), a Win32 API, to start executing the streaming software, and the client shell 444 uses a debugging property. When an error occurs in the streaming software (e.g., because a file resource is missing), the error may be trapped by the client shell which then can download the appropriate file resource from the server 310. Naturally, before the implementation of the suspension of streaming software, it was still possible to run the streaming software by downloading all necessary files prior to execution, such as by mounting. Thus, suspension of streaming software is a non-limiting aspect of various embodiments.

In a non-limiting embodiment, the client shell 444 prompts a subscriber for valid login name and password. In another embodiment, the client shell 444 records when the streaming of streaming software is first started and terminated. Various states get formatted into messages which are, for example, sent to the server 310 or an associated website server. For example, IIS software extensions may be used to send data to a database. The client shell 444 may also be responsible for downloading streaming software.

Certain embodiments may include encryption processes. Accordingly, in a non-limiting embodiment, the client shell 444 may decrypt downloaded files, if necessary. In a non-limiting embodiment, an encryption technique is used to prevent subscribers from running streaming software while not connected to the server 320.

In a non-limiting embodiment, the encryption technique includes not allowing the subscriber to copy or run streaming software if an ungraceful disconnect occurs between the client 320 and the server 310. This includes, by way of example but not limitation, if a subscriber intentionally disconnects from the server 310 or if any crashes occur, etc. The encryption technique is in contrast to the relatively limited techniques to prevent any purchaser of software from making illegal copies.

In a non-limiting embodiment, to improve performance, a subset of files are encrypted. This is because performance will be impacted for every decryption action performed by the client shell 444. In an embodiment, only a main executable file is encrypted. If desired, more files can, of course, be encrypted, but with potential (though not certain) adverse impact on performance. If files other than the executable are decrypted, the client shell 444 will decrypt as the files are downloaded to the client 320. The main executable file will be decrypted in memory just prior to program execution. If files are written to local hard disk unencrypted, streaming software protection is compromised.

Certain embodiments may include compression. Compression is used to reduce total number of bytes that have are sent across a network/modem from the server 310 to the client 320. Thus, the client shell 444 may or may not also uncompress blocks of a streaming program prior to use.

Watchdog time support was incorporated into a prototype system in December 1996 to make sure streaming software was running and to perform other "watchdog" functions. In a non-limiting embodiment, the client shell 444 can act as a "watchdog" of subscriber running times, and can communicate extensively with the server 310 to, by way of example but not limitation, ensure that a subscriber is accessing appropriate memory resources at any given time.

In a non-limiting embodiment, the header of a main executable file may be scrambled so that, even if cached, a subscriber cannot execute the streaming program without using the client shell 444. Of course, in an alternative, the client shell 444 could simply delete one or more files to prevent unauthorized execution of the program.

In a non-limiting embodiment, downloaded streaming software can only be run using the client shell 444, which must be coupled somehow to the server 310. In this way, the server 310 can log a subscriber's usage of the streaming software, if desired. The client shell is associated with the transactions 312 to 315 of FIG. 3.

In a non-limiting embodiment, the cache 446 is implemented in volatile memory. The cache 446 may be a combination of non-volatile storage and volatile memory. It should be noted that if all files associated with a streaming program are left on the client 320, then, in some cases, performance can be increased if the subscriber uses the streaming program again. If the client shell 444 determines that a next required file is already stored on the client 320 (in the cache 446), then the file need not be downloaded and, if applicable, uncompressed and decrypted.

To capitalize on these advantages, caching was added to a prototype system in October 1996. Some files are left in the cache 446 after execution of a streaming program. This allows execution of a "repeat" stream to occur faster. Since files already reside locally in the cache 446, the files don't have to be downloaded again. So long as a sufficient amount of memory is allocated (subject to actual storage limitations at the client 320), the cache 446 can contain every resource required by the streaming program. If the cache 446 is not large enough, then files have to be deleted from the client 320 and downloaded again when needed. There are many known discard priority techniques. The cache 446 is primarily associated with the transaction 315 of FIG. 3.

The browser 448 may or may not be required in various embodiments. A user of the client 320 may select software titles using the browser 448, in a manner that is well-known, or some other mechanism could be used. For example, an administrator could assign a software title for streaming to client 320, obviating the need for a browser-based title selection procedure. The browser is associated with the transactions 311 and 312 of FIG. 3.

Figure 5A:
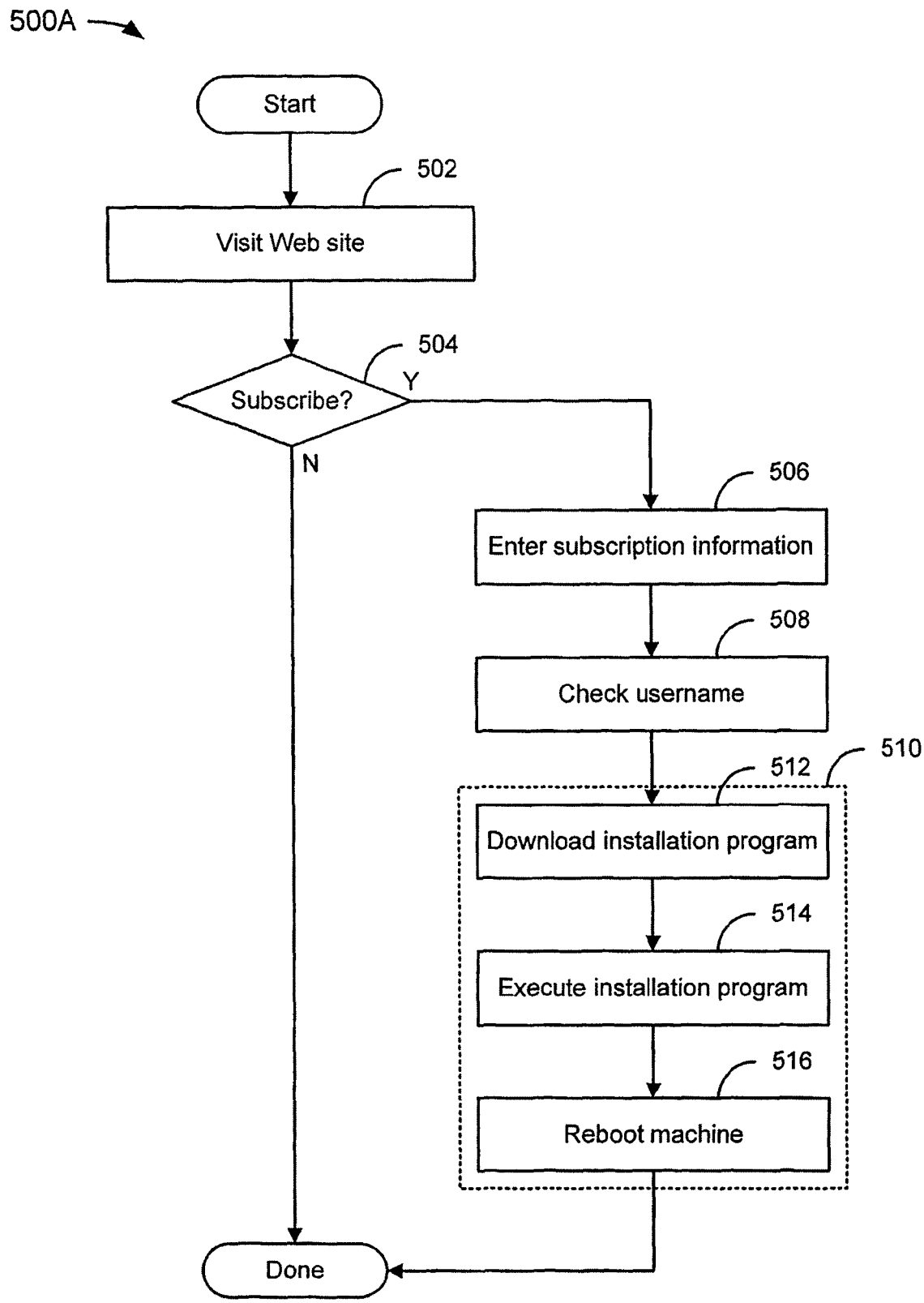
FIGS. 5A, 5B, and 5C depict flowcharts of methods according to embodiments.

FIG. 5A depicts a flowchart 500A of a method according to an embodiment. The flowchart 500A is intended to illustrate a subscription stage of a client-server model. It may be noted that the method of FIG. 5A is optional since the subscription stage could be conducted using other techniques, such as an administrator adding new subscribers. Moreover, subscription could be assumed for clients on a particular network, such as a company LAN. Accordingly, FIG. 5A is intended to serve as an optional example.

In an embodiment, the flowchart 500A starts at module 502 wherein a website is visited. A potential subscriber may visit a website using, by way of example but not limitation, a browser. The website may be maintained by a software title rental, streaming, and/or provisioning entity.

In an embodiment, in the flowchart 500A, at decision point 504 it is determined whether to subscribe. A potential subscriber may decide to subscribed (504-Y) by selecting an appropriate link, pressing a button, filling out a form, or some other action that would be known to someone knowledgeable of browsing, for example, the Internet. If a potential subscriber does not decide to subscribe (504-N), then the flowchart 500A ends. Otherwise the flowchart continues at module 506.

In an embodiment, the flowchart 500A continues at module 506 wherein subscription information is entered. Potential subscribers may enter optional or required information directly onto the website, send a subscription request, or provide subscription information by some other means. Potential subscribers may sign up for a unique username, password, typical form input, and enter credit information.

In an embodiment, the flowchart 500A continues at module 508 wherein a username is checked. The username may be part of the subscription information provided by a potential subscriber. The username must typically be unique, though an alternative embodiment wherein multiple subscribers share the same username is possible. In the event the username is not unique, if uniqueness is required, the potential subscriber may be prompted to enter a different username, be provided with available username suggestions, or be provided with a username.

Once subscription information has been received and a (typically unique) username received or assigned, at module 510 a local machine is configured and the flowchart 500A ends. The configuration at module 510 may involve, by way of example but not limitation, modules 512, 514, and 516.

In an embodiment, the flowchart 500A continues at module 512 wherein an installation program is downloaded. In a non-limiting embodiment, once the subscriber account is cleared, the subscriber may download and install an installation program, which may include a client shell program. The installation program may be downloaded from a server to a local machine. It may be noted that in an enterprise embodiment, an administrator or technician could configure each machine, rather than downloading the installation program.

In an embodiment, the flowchart 500A continues at module 514 wherein an installation program is executed. Again, in an enterprise embodiment, rather than executing an installation program, the client could simply be configured as appropriate.

Figure 5B:
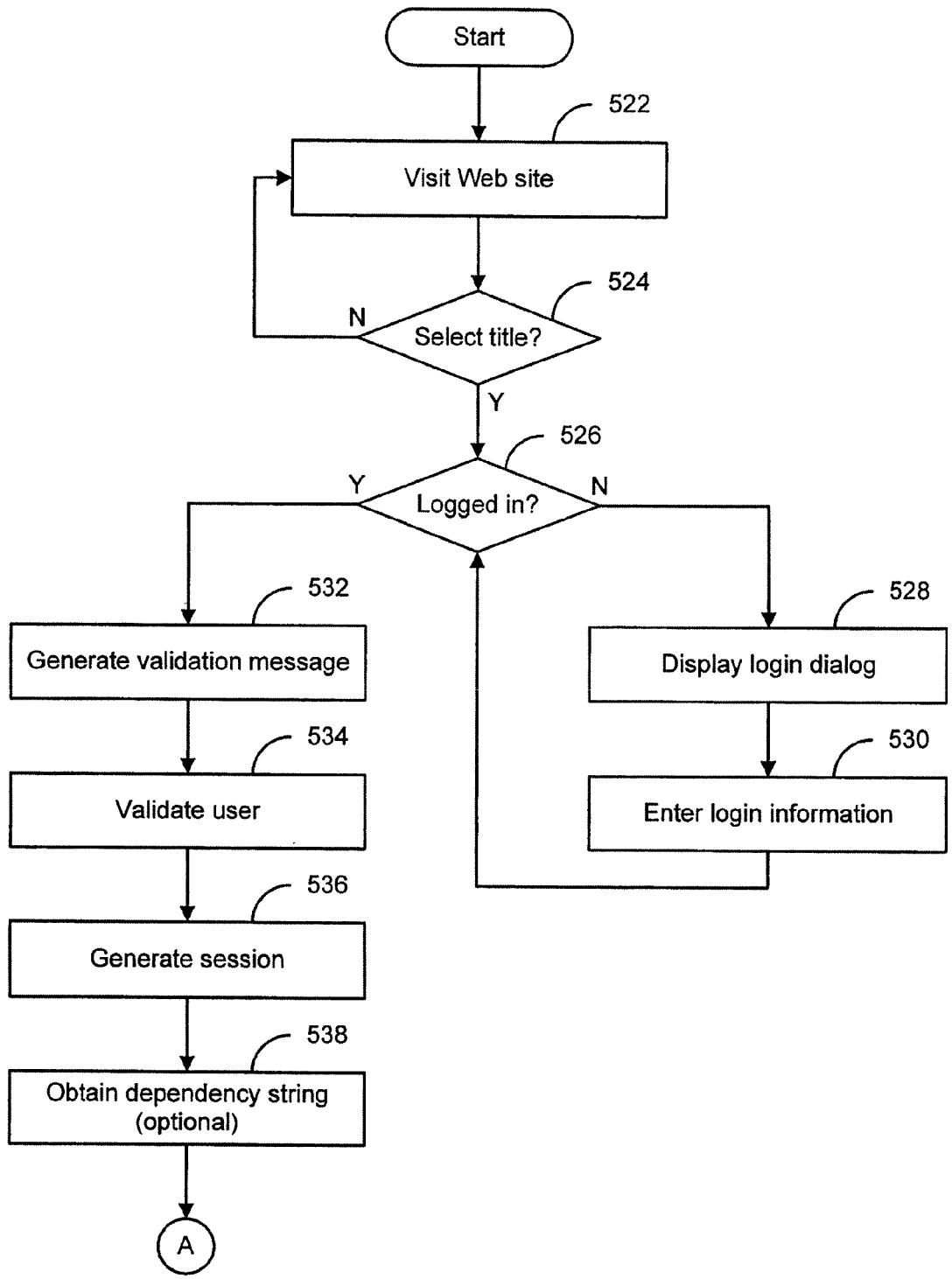
Figure 5C:
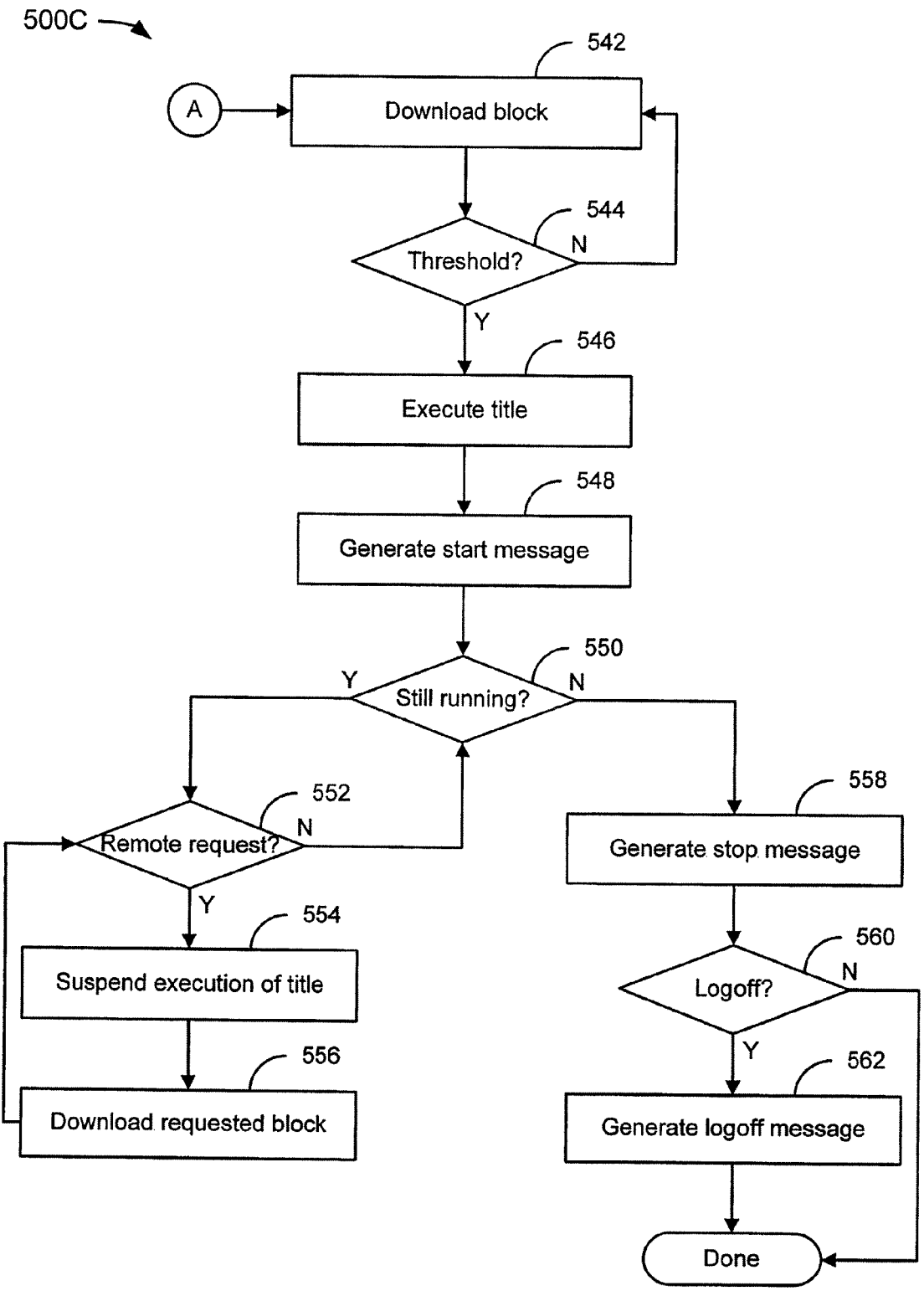

In an embodiment, the flowchart 500A ends at module 516 wherein a local machine is rebooted. An embodiment in which the client is not rebooted is possible. FIGS. 5B and 5C illustrate subsequent steps following subscription and configuration (if necessary) of a local machine, which may be referred to as a client.

FIG. 5B depicts a flowchart 500B of a method according to an embodiment. Once a subscription stage, such as, by way of example but not limitation, described with reference to FIG. 5A, has been completed, subscribers can select software title for execution. An example of a method associated with software title execution is described in FIGS. 5B and 5C. It may be noted that at the start of FIG. 5B, a user is assumed to be a subscriber. At the end of FIG. 5C, the subscriber finishes executing a software title (and may or may not logoff).

In the example of FIG. 5B, the flowchart 500B starts at module 522 wherein a website is visited. A subscriber may visit a website using, by way of example but not limitation, a browser. The website may be maintained by a software title rental, streaming, and/or provisioning entity.

In the example of FIG. 5B, in the flowchart 500B, at decision point 524 it is determined if a title has been selected. A subscriber may select a title (524-Y) by selecting an appropriate link, pressing a button, filling out a form, or some other action that would be known to someone knowledgeable of browsing, for example, the Internet. If a subscriber does not decide to select a title (524-N), then the flowchart 500B loops back to module 522. Otherwise the flowchart 500B continues at module 526.

In the example of FIG. 5B, in the flowchart 500B, at decision point 526 it is determined whether a subscriber is logged in. A subscriber may be logged in (526-Y) from a previous session or because, for example, in an enterprise embodiment, a subscriber may automatically login when logging into a typical enterprise account, obviating a login procedure later when obtaining a software title.

If a subscriber is not logged in (526-N), then the flowchart 500B continues at module 528 wherein a login dialog is displayed and at module 530 wherein login information is entered. According to an alternative embodiment, once a title selection is made, a token file is downloaded to the local computer, which executes a single instance of a client shell program. If the subscriber has not logged on yet (526-N), the client shell presents a login dialog box on the local machine in order for the subscriber to enter username and password (to login). The login dialog and login information entry is well-known in the art of computer security and is not described in detail herein. In any case, the flowchart 500B loops back to decision point 526, and the subscriber is now (presumably) logged in.

If a subscriber is logged in (526-Y), then the flowchart 500B continues at module 532 wherein a validation message is generated and at module 534 wherein the subscriber is validated. In an embodiment, the login information is formatted into a message and sent to a server. The username and password is validated. Typically, a check is also performed to see if the associated account has been disabled. Another check is made to see if the username is already in use; this prevents someone from sharing/loaning their username with someone else. In an enterprise embodiment, this also may promote computer security.

Once the subscriber has logged in (and/or has been validated), in the example of 5B, the flowchart 500B continues at module 536 wherein a session is generated. Generating a session may include generating a unique session ID. The unique session ID may be sent back to a client shell associated with the subscriber. In an alternative embodiment, the client shell decodes a token file associated with the generated session, and determines which software title is associated with the token file.

In the example of FIG. 5B, the flowchart 500B continues at optional module 538 wherein a dependency string is obtained. It may be noted that a dependency string is not necessary for the purposes of downloading a file. In an embodiment where a software title need not be executed prior to downloading the entire package, a dependency string may not be required and/or desired. A dependency string, according to an exemplary embodiment, includes a file order. If the files are downloaded according to the file order, then the files necessary to begin execution should be received first. In addition to the dependency string, a client may or may not also receive a "minimum number of files" value. This value indicates to the client shell that the client shell should not try to execute until the minimum number of files has been received. In an alternative embodiment, the client shell issues a message with the name of a selected software title. The server checks a program database and returns a "stream" string. The stream string is a string with the software dependencies listed in order. The stream string may also include a number that will tell the client shell the minimum number of files that need to be downloaded before execution.

FIG. 5C depicts a flowchart 500C that continues from module 540 (FIG. 5B). In the example of FIG. 5C, the flowchart 500C starts at module 542 wherein a block is downloaded. In an embodiment, a client shell parses a stream string, and starts flipping files in order down to a local machine. Blocks are discrete chunks of the file that are downloaded as part of the streaming procedure. Files are decompressed (if compression is used) and written to the local hard disk in relative order as on, by way of example but not limitation, original CD. If encryption is used, the software title, even though has been written to the local machine's hard disk, should not be able to be executed any other way (command line, network neighborhood, etc.) except from the client shell software.

In the example of FIG. 5C, in the flowchart 500C, at decision point 544 it is determined whether a threshold has been reached. In an embodiment, the threshold is a minimum (or greater) number of blocks that must be downloaded before the client executes the software title as a new process. If the threshold has not been reached (544-N), the flowchart 500C loops back to module 542. If, on the other hand, the threshold has been reached (544-Y), then the flowchart 500B continues at module 546 wherein a title is executed as a new process.

In the example of FIG. 5C, the flowchart 500C continues at module 548 wherein a start message is generated. In an embodiment, once streaming software is running, the client shell sends a "start-time" message to a database in order to log subscriber usage.

In the example of FIG. 5C, in the flowchart 500C, at decision point 550 it is determined whether the software is still running. If the software is still running (550-Y), then at decision point 552 it is determined whether a remote request is required. If no remote request is required (552-N), then presumably the request can be satisfied locally, so the flowchart 500C simply loops back to decision point 550. If, on the other hand, a remote request is required (552-Y), then the flowchart 500C continues at module 554 with suspending the execution of the software title and at module 556 with downloading blocks associated with the request, then looping back to decision point 552 to determine whether another remote request is required. In this way, the client shell may download the rest of the software package either on demand or as a background task.

If it is determined that the software title is no longer running (550-N), then the flowchart 500C continues at module 558 wherein a stop message is generated. In an embodiment, when software terminates for any reason, purposely by subscriber or due to a software crash, a message is sent to database to record when software execution ended. This accurately tracks subscriber usage, which may be crucial to a company's billing policy, or may serve other purposes. If the software is some kind of game, high scores may be sent to a database also.

In the example of FIG. 5C, in the flowchart 500C, at decision point 560 it is determined whether a logoff has occurred. If a logoff has not occurred (560-N), then the flowchart 500C ends. A logoff may not occur in the case of a software crash or, perhaps, if a subscriber simply closes a program, for example. If, on the other hand, a logoff has occurred (560-Y), then the flowchart 500C continues at module 562 wherein a logoff message is generated, then the flowchart 500C ends. In an embodiment, a subscriber can logout at any point. In this case, the client shell may, by way of example but not limitation, format a message to logoff the subscriber.

What is claimed is:

1. A method comprising:
    downloading, using a processor, blocks of a software title until a number of the blocks of the software title equals an executable threshold;
    initiating execution of the software title when the number of the blocks equals the executable threshold;
    continuing to download blocks of the software title while the software title is executed.

2. The method of claim 1, further comprising selecting the software title for download.

3. The method of claim 1, further comprising receiving a dependency string associated with the software title, wherein the dependency string includes software selected from the group consisting of executables and dynamic link libraries (DLLs).

4. The method of claim 1, further comprising generating a start message generally contemporaneously with said initiating execution of the software title.

5. The method of claim 1, further comprising decrypting one or more of the download blocks.

6. The method of claim 1, further comprising:
    requesting data, associated with the software title, that is available at a remote location;
    suspending execution of the software title; downloading blocks associated with the requested data;
    resuming execution of the software title with the requested data.

7. The method of claim 1, further comprising:
    completing execution of the software title;
    generating an end message generally contemporaneously with said completing execution of the software title.

8. A method comprising:
    sending to a client an index for the client to build a virtual directory structure to facilitate executing a software title;
    streaming, using a processor, a subset of blocks associated with the software title to the client;
    streaming additional blocks associated with the software title to the client on demand.

9. The method of claim 8 further comprising preparing the software title for streaming, including creating an index containing information about registry changes, files, and directories created.

10. The method of claim 8 further comprising creating an index for use by a client-side file system driver to present the virtual directory structure to the client.

11. The method of claim 8 further comprising sending a dependency string associated with the software title to the client.

12. The method of claim 8, further comprising encrypting one or more of the subset of blocks.

13. The method of claim 8 further comprising:
    receiving from the client a start message associated with a start of execution of the software title;
    receiving from the client a stop message associated with an end to execution of the software title.

14. The method of claim 8 further comprising uploading a client shell installation program to the client.

15. The method of claim 8 further comprising tracking data associated with a session of streaming execution of the software title by the client.

16. The method of claim 8 further comprising tracking the subset of blocks associated with the software title.

17. The method of claim 8, further comprising tracking the additional blocks associated with the software title.

* * * * *